(12) United States Patent
Simaitis

(10) Patent No.: US 11,543,261 B2
(45) Date of Patent: Jan. 3, 2023

(54) DYNAMIC MAP SYSTEM AND METHOD

(71) Applicant: Palantir Technologies Inc., Palo Alto, CA (US)

(72) Inventor: Aistis Simaitis, Vilnius (LT)

(73) Assignee: Palantir Technologies Inc., Denver, CO (US)

( * ) Notice: Subject to any disclaimer, the term of this patent is extended or adjusted under 35 U.S.C. 154(b) by 126 days.

(21) Appl. No.: 16/265,463

(22) Filed: Feb. 1, 2019

(65) Prior Publication Data
US 2019/0250008 A1    Aug. 15, 2019

(30) Foreign Application Priority Data

Feb. 15, 2018  (GB) ...................................... 1802493
Jun. 11, 2018  (GB) ...................................... 1809582

(51) Int. Cl.
*G01C 21/36*      (2006.01)
*G06F 16/29*      (2019.01)

(52) U.S. Cl.
CPC ....... *G01C 21/3676* (2013.01); *G01C 21/367* (2013.01); *G01C 21/3614* (2013.01); *G06F 16/29* (2019.01)

(58) Field of Classification Search
CPC ............... G01C 21/38; G01C 21/3804; G01C 21/3819; G01C 21/367; G01C 21/3614; G01C 21/3876; G01C 21/34; G01C 21/26; G01C 21/3415; G06F 16/29; B60L 2240/60; G08G 1/096838
See application file for complete search history.

(56) References Cited

U.S. PATENT DOCUMENTS

| | | |
|---|---|---|
| 7,133,771 B1 | 11/2006 | Nesbitt |
| 7,881,861 B2 | 2/2011 | Kravets et al. |
| 8,108,141 B2 | 1/2012 | Ehrlacher |
| 8,463,537 B2 | 6/2013 | Mueller et al. |
| 9,360,335 B1 | 6/2016 | Powelson et al. |
| 9,547,986 B1 | 1/2017 | Curlander et al. |
| 9,784,589 B1 | 10/2017 | Gyenes et al. |
| 10,133,995 B1 | 11/2018 | Reiss et al. |

(Continued)

FOREIGN PATENT DOCUMENTS

| | | |
|---|---|---|
| EP | 3528135 | 8/2019 |
| WO | WO 2015/023437 | 2/2015 |

OTHER PUBLICATIONS

Official Communication for European Patent Application No. 19157597.6 dated Jun. 13, 2019.

(Continued)

*Primary Examiner* — Ig T An
(74) *Attorney, Agent, or Firm* — Knobbe, Martens, Olson & Bear LLP

(57) ABSTRACT

The present disclosure relates to a computer system, configured to receive two or more instances of a first route object comprising a geotemporal attribute comprising geospatial and temporal data to define an instance of the first route object; map the two or more instances of the first route object on to digital map data to define respective first route vertices in the digital map; and receive user input defining an interval and applying the defined interval intermediate chronologically adjacent respective first route vertices to define first waypoints between the respective first route vertices.

20 Claims, 13 Drawing Sheets

(56) References Cited

U.S. PATENT DOCUMENTS

| | | | |
|---|---|---|---|
| 2006/0184314 A1 | 8/2006 | Couckuyt et al. | |
| 2007/0168118 A1 | 7/2007 | Lappe et al. | |
| 2007/0293958 A1 | 12/2007 | Stehle et al. | |
| 2010/0036599 A1 | 2/2010 | Froeberg et al. | |
| 2011/0106429 A1 | 5/2011 | Poppen et al. | |
| 2012/0089920 A1* | 4/2012 | Eick | G06T 11/206 715/739 |
| 2012/0123678 A1 | 5/2012 | Poppen et al. | |
| 2012/0123806 A1 | 5/2012 | Schumann et al. | |
| 2012/0136689 A1 | 5/2012 | Ickman et al. | |
| 2012/0253661 A1 | 10/2012 | Tuukkanen | |
| 2014/0005924 A1* | 1/2014 | Letz | G01C 21/343 701/424 |
| 2014/0005941 A1 | 1/2014 | Paek et al. | |
| 2014/0282093 A1 | 9/2014 | Burke et al. | |
| 2014/0309927 A1* | 10/2014 | Ricci | G06Q 30/0645 701/424 |
| 2014/0372498 A1 | 12/2014 | Mian et al. | |
| 2015/0032366 A1 | 1/2015 | Man et al. | |
| 2015/0051829 A1* | 2/2015 | Gearhart | G01C 21/20 701/527 |
| 2015/0338852 A1 | 11/2015 | Ramanujam et al. | |
| 2015/0339928 A1 | 11/2015 | Ramanujam et al. | |
| 2016/0069694 A1 | 3/2016 | Tao et al. | |
| 2016/0109251 A1 | 4/2016 | Thakur | |
| 2016/0109252 A1 | 4/2016 | Caine et al. | |
| 2016/0142964 A1 | 5/2016 | Todasco et al. | |
| 2016/0203422 A1 | 7/2016 | Demarchi et al. | |
| 2016/0229404 A1 | 8/2016 | Byun et al. | |
| 2016/0273930 A1 | 9/2016 | Wada et al. | |
| 2016/0298974 A1 | 10/2016 | Newlin et al. | |
| 2016/0298977 A1 | 10/2016 | Newlin et al. | |
| 2016/0334233 A1 | 11/2016 | Baverstock | |
| 2016/0379486 A1 | 12/2016 | Taylor | |
| 2017/0167882 A1 | 6/2017 | Ulloa Paredes et al. | |
| 2017/0169373 A1 | 6/2017 | Roulland et al. | |
| 2017/0192437 A1 | 7/2017 | Bier et al. | |
| 2017/0262790 A1 | 9/2017 | Khasis | |
| 2017/0268891 A1 | 9/2017 | Dyrnaes et al. | |
| 2017/0276507 A1 | 9/2017 | Zacharenko | |
| 2017/0300049 A1 | 10/2017 | Seally | |
| 2017/0314948 A1 | 11/2017 | Racah et al. | |
| 2017/0314949 A1 | 11/2017 | Rovik et al. | |
| 2017/0328725 A1* | 11/2017 | Schlesinger | G01C 21/3484 |
| 2017/0337813 A1 | 11/2017 | Taylor | |
| 2018/0143027 A1 | 5/2018 | Schlesinger et al. | |
| 2018/0143649 A1 | 5/2018 | Miao et al. | |
| 2018/0211541 A1 | 7/2018 | Rakah et al. | |
| 2018/0211546 A1 | 7/2018 | Smartt et al. | |
| 2018/0259976 A1 | 9/2018 | Williams et al. | |
| 2018/0309592 A1* | 10/2018 | Stolfus | G08G 1/0969 |

OTHER PUBLICATIONS

Anonymous, "Proximity analysis-Help | ArcGIS for Desktop," Feb. 2, 2018, retrieved from the Internet: URL: https://web.archive.org/web/20180202155120/http://desktop.arcgis.com/en/arcmap/10.3/analyze/commonly-used-tools/proximity-analysis.htm#, 12 pages.

Wang, "Why police and policing need GIS: an overview," Annals of GIS, vol. 18, No. 3, Jul. 5, 2012, pp. 159-171.

Official Communication for European Patent Application No. 19157597.6 dated Oct. 9, 2020, 8 pages.

Official Communication for European Patent Application No. 19157597.6 dated Jan. 27, 2022, 9 pages.

* cited by examiner

300

| Object type | Object ID | | Geospatial data | Temporal data |
|---|---|---|---|---|
| 302 | 304 | | 306 | 308 |
| | Entity | Route | | |
| | 305 | 307 | | |

| | Route | Object ID | | Geospatial data | Temporal data |
|---|---|---|---|---|---|
| 402 | Route | Blue | 1 | geo702 | t702 |
| 404 | Route | Blue | 1 | geo704 | empty |
| 406 | Route | Blue | 1 | geo706 | empty |
| 408 | Route | Blue | 1 | geo708 | t708 |

| | Route | Object ID | | Geospatial data | Temporal data |
|---|---|---|---|---|---|
| 502 | Route | Red | 1 | geo802 | t802 |
| 504 | Route | Red | 1 | geo804 | empty |
| 520 | Route | Red | 1 | geo820 | t820 |

Fig. 5

DYNAMIC MAP SYSTEM AND METHOD

FIELD

The present disclosure generally relates to a system and method for augmenting data of a data store. In particular, but not exclusively, for augmenting data in a data store in order to enhance the interpretation of a visual representation of the data in the data store.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

The display of a digital map, such as generated by Google maps, or the display of images of parts of the earth such as available using Google Earth may have routes "drawn" on the display. The term "drawn" includes user or automated activity in which a stylus or other pointing device or cursor is moved from one part of the display to another part of the display to trace out a line defining a desired route or a line automatically displayed overlaying the map or earth image. Such routes may also be defined by a series of points, sometimes known as vertices in the plural and vertex in the singular, which may automatically be joined together by a line under the control of a computer system driving the display. The data corresponding to the vertices and or the lines overlaid on the image is stored in a computer-based database. Optionally, routes or other features to be overlaid onto the map or Google Earth display may be imported from a suitable file such as a keyhole markup language file, KML or KMZ. Optionally, a map or image of a part of the earth may be displayed using other programs utilising geospatial information and responsive to Shape files, for example, for overlaying routes or other features onto the map or earth image.

The map or Earth image data and the vertices and line data, as well as data defining other features overlaid on the map or earth image, is stored in computer-based databases. The map or earth image data and vertices, line data or other feature data may be stored in the same computer-based database or different computer-based databases.

Examples of computer-based database systems which may be used in one or more embodiments in accordance with the present disclosure are disclosed, by way of example only, in U.S. Pat. Nos. 7,962,495B1, 8,489,623 B1 and 8,856,153 B1, the contents of which are incorporated herein by reference. Computer-based database systems, such as disclosed in the foregoing, are relational database management systems and typically organize data according to a fixed structure of tables and relationships. The structure may be described using an ontology, embodied in a database schema, comprising a data model that is used to represent the structure and reason about objects in the structure. As a consequence, such databases may store complex data structures with complex relationships between them and it may be difficult for a user to understand the relationships between various data items and objects in such databases, and to create or understand new relationships within such databases, not least because the database structure itself is not conducive to creating new relationships.

When a data element is to be input into a computer database it needs to be configured in such a way that it suits the database schema and ontology. That configuration may be by way of a user interface defining respective input fields corresponding to the database schema. A user wishing to review the presentation of aspects of the database while inputting data to the database or using the presentation to assist in the analysis and manipulation of data would require a separate user interface display through which to enter data modifications of data into the database. Thus, the user would require a separate display screen and or computer or, if the database's interface were to be displayed on the same screen as the display of data, the user will find that the display of data may be obscured or reduced in size in order to make way for the computer database user interface.

Aspects, examples and embodiments in accordance with the claimed subject matter were devised with the foregoing in mind.

SUMMARY

In general outline, in a first aspect, the following discloses a computer system, configured to receive two or more instances of a first route object comprising a geotemporal attribute comprising geospatial and temporal data to define an instance of the first route object, map the two or more instances of the first route object on to digital map data to define respective first route vertices in the digital map; and receive user input defining an interval and applying the defined interval intermediate chronologically adjacent respective first route vertices to define first waypoints between the respective first object vertices, thereby defining a first journey object.

Also, in general outline, the following discloses in a second aspect a method for operating computer system, the method comprising receiving two or more instances of a first route object comprising a geotemporal attribute comprising geospatial and temporal data to define an instance of the first route object, mapping the two or more instances of the first route object on to digital map data to define respective first route vertices in the digital map; and receiving user input defining an interval and applying the defined interval intermediate chronologically adjacent respective first route vertices to define first waypoints between the respective first route vertices, thereby defining a first journey object.

In one embodiment, a computer system is configured to receive two or more instances of a first route object comprising a geotemporal attribute comprising geospatial and temporal data to define an instance of the first route object, map the two or more instances of the first route object on to digital map data to define respective first route vertices in the digital map; and receive user input defining an interval and applying the defined interval intermediate chronologically adjacent respective first route vertices to define first waypoints between the respective first route vertices. In one embodiment, the two or more instances of the first route object are received from a database comprising a plurality of route objects comprising the geotemporal attribute comprising geospatial and optionally temporal data to define an instance of each of the plurality of first route objects within the database. In one embodiment, the computer system is further configured to provide data to a display driver to configure a display screen coupled to the computer system to display a map image representative of said digital map data; and display in the image a first indicium representative of the first route object at respective first route vertices. In one embodiment, the computer system is further configured to define the waypoints along a direct path between chronologically adjacent respective first route vertices. In one embodiment, the computer system is further configured to instantiate an instance of a first waypoint object comprising a geotemporal attribute comprising geospatial and temporal data to define the respective first waypoints. In one embodiment, the computer system is further configured to assign to a geotemporal attribute of the first waypoint object instance first waypoint object instance geospatial data and optionally first waypoint object instance temporal data respectively derived from geospatial data and temporal data of one or both of the chronologically adjacent respective first route vertices. In one embodiment, the computer system is configured to define the first waypoints as a property of a locus defined by the respective first route vertices. In one embodiment, In one embodiment, the computer system is configured to store the first waypoint object instance in the database. In one embodiment, the computer system is configured to provide data to the display driver to configure the display screen to display in the map image first waypoint indicia representative of the first waypoint object at respective first waypoints. In one embodiment, the computer system is configured to receive two or more instances of a second route object from the database, map the two or more instances of the second route object on to digital map data, to define respective second route vertices in the digital map, and receive user input defining an interval and applying the defined interval intermediate chronologically adjacent respective second route vertices to define second waypoints between the respective second route vertices. In one embodiment, the two or more instances of the second route object are received from a database comprising a plurality of route objects comprising the geotemporal attribute comprising geospatial and optionally temporal data to define an instance of each of the plurality of second route objects within the database. In one embodiment, the computer system is configured to provide data to the display driver to configure a display screen coupled to the computer system to display in the map image a second indicium representative of the second route object at respective second route vertices. In one embodiment, the computer system is configured to define the waypoints along a direct path between chronologically adjacent respective second route object vertices. In one embodiment, the computer system is configured to instantiate an instance of a second waypoint object comprising a geotemporal attribute comprising geospatial and temporal data to define the respective second waypoints. In one embodiment, the computer system is configured to assign to a geotemporal attribute of the second waypoint object instance second waypoint instance geospatial data and optionally second waypoint object instance temporal data respectively derived from geospatial data and temporal data of one or both of the chronologically adjacent respective second route vertices. In one embodiment, the computer system is configured to define the second waypoint objects as a property of a locus defined by the respective second route object vertices. In one embodiment, the computer system is configured to store the second waypoint object instance in the database. In one embodiment, the computer system is configured to provide data to the display driver to configure the display screen to display in the map image second waypoint indicia representative of the second waypoint object at respective second waypoints. In one embodiment, the computer system is configured to determine a first proximity value representative of the proximity of a one of the second waypoints or a one of the respective second route object vertices to a one of the first waypoints or a one of the respective first route object vertices fulfilling a first proximity criterion. In one embodiment, the computer system is configured to indicate the first proximity value fulfilling the first proximity criterion. In one embodiment, the computer system is configured to retrieve from the database or receive as an input from a user an instance of a third object comprising a geotemporal attribute comprising geospatial and temporal data and to map the geospatial data of the third object on to the digital map data to define a third location in the digital map, wherein the instance of the third object further comprises an event attribute and the temporal data corresponds to a time of an occurrence of an event corresponding to the event attribute. In one embodiment, the computer system is configured to provide data to the display driver to configure the display screen to display in the map image a third indicium representative of the third object at the third location. In one embodiment, the computer system is configured to determine a second proximity value representative of the proximity of a one of the first waypoints or first route object vertices to the third location and or a third proximity value representative of a one of the second waypoints or second object vertices to the third location fulfilling a proximity criterion. In one embodiment, the computer system is configured to indicate the second proximity value and or third proximity value fulfilling a proximity criterion. In one embodiment, the computer system is configured to generate a first contour around the first waypoints and first route vertices corresponding to a plurality of the first proximity value and to provide data to the display driver to display a first contour line representative of the first contour. In one embodiment, the computer system is configured to generate a first contour around the first waypoints and first route vertices corresponding to a plurality of the first proximity value and to provide data to the display driver to display a region bounded by the first contour comprising a pattern or colour visually distinct from the remainder of the image. In one embodiment, the computer system is configured to generate a second contour around the third location corresponding to a plurality of the second proximity value and to provide data to the display driver to display a second contour line representative of the second contour. In one embodiment, the computer system is configured to generate a second contour around the third location corresponding to the second proximity value and to provide data to the display driver to display a region bounded by the second contour comprising a pattern or colour visually distinct from the remainder of the image. In one embodiment, the computer system is configured to generate a third contour around the third location corresponding to the third proximity value and to provide data to the display driver to display a third contour line representative of the third contour. In one embodiment, the computer system is configured to generate a third contour around the third location corresponding to the second proximity value and to provide data to the display driver to display a region bounded by the third contour comprising a pattern or colour visually distinct from the remainder of the image. In one embodiment, the first proximity value is representative of a geospatial distance and the first proximity value criterion is a geospatial distance. In one embodiment, the database comprises plural individually accessible databases.

In one embodiment, a method performed using one or more processors comprises receiving two or more instances of a first route object comprising a geotemporal attribute comprising geospatial and temporal data to define an instance of the first route object, mapping the two or more instances of the first route object on to digital map data to define respective first route vertices in the digital map; and receiving user input defining an interval and applying the defined interval intermediate chronologically adjacent respective first route vertices to define first waypoints between the respective first route vertices. In one embodiment, the method further comprises receiving the two or more instances of the first route object from a database comprising a plurality of route objects comprising the geotemporal attribute comprising geospatial and optionally temporal data to define an instance of each of the plurality of first route objects within the database. In one embodiment, the method further comprises providing data to a display driver to configure a display screen coupled to the computer system to display a map image representative of said digital map data; and display in the image a first indicium representative of the first route object at respective first route vertices. In one embodiment, the method further comprises defining the waypoints along a direct path between chronologically adjacent respective first route vertices. In one embodiment, the method further comprises instantiating an instance of a first waypoint object comprising a geotemporal attribute comprising geospatial and temporal data to define the respective first waypoints. In one embodiment, the method further comprises assigning to a geotemporal attribute of the first waypoint object instance first waypoint object instance geospatial data and optionally first waypoint object instance temporal data respectively derived from geospatial data and temporal data of one or both of the chronologically adjacent respective first route vertices. In one embodiment, the method further comprises defining the first waypoints as a property of a locus defined by the respective first route vertices. In one embodiment, the method further comprises storing the first waypoint object instance in the database. In one embodiment, the method further comprises providing data to the display driver to configure the display screen to display in the map image first waypoint indicia representative of the first waypoint object at respective first waypoints. In one embodiment, the method further comprises receiving two or more instances of a second route object from the database, mapping the two or more instances of the second route object on to digital map data, to define respective second route vertices in the digital map; and receiving user input defining an interval and applying the defined interval intermediate chronologically adjacent respective second route vertices to define second waypoints between the respective second route vertices. In one embodiment, the method further comprises receiving the two or more instances of the second route object from a database comprising a plurality of route objects comprising the geotemporal attribute comprising geospatial and optionally temporal data to define an instance of each of the plurality of second route objects within the database. In one embodiment, the method further comprises providing data to the display driver to configure a display screen coupled to the computer system to display in the map image a second indicium representative of the second route object at respective second route vertices. In one embodiment, the method further comprises defining the waypoints along a direct path between chronologically adjacent respective second route object vertices. In one embodiment, the method further comprises further comprising instantiating an instance of a second waypoint object comprising a geotemporal attribute comprising geospatial and temporal data to define the respective second waypoints. In one embodiment, the method further comprises assigning to a geotemporal attribute of the second waypoint object instance second waypoint instance geospatial data and optionally second waypoint object instance temporal data respectively derived from geospatial data and temporal data of one or both of the chronologically adjacent respective second route vertices. In one embodiment, the method further comprises defining the second waypoint objects as a property of a locus defined by the respective second route object vertices. In one embodiment, the method further comprises storing the second waypoint object instance in the database. In one embodiment, the method further comprises providing data to the display driver to configure the display screen to display in the map image second waypoint indicia representative of the second waypoint object at respective second waypoints. In one embodiment, the method further comprises determining a first proximity value representative of the proximity of a one of the second waypoints or a one of the respective second route object vertices to a one of the first waypoints or a one of the respective first route object vertices fulfilling a first proximity criterion. In one embodiment, the method further comprises indicating the first proximity value fulfilling the first proximity criterion. In one embodiment, the method further comprises retrieving from the database or receiving as an input from a user an instance of a third object comprising a geotemporal attribute comprising geospatial and temporal data and to map the geospatial data of the third object on to the digital map data to define a third location in the digital map, wherein the instance of the third object further comprises an event attribute and the temporal data corresponds to a time of an occurrence of an event corresponding to the event attribute. In one embodiment, the method further comprises providing data to the display driver to configure the display screen to display in the map image a third indicium representative of the third object at the third location. In one embodiment, the method further comprises determining a second proximity value representative of the proximity of a one of the first waypoints or first route object vertices to the third location and or a third proximity value representative of a one of the second waypoints or second object vertices to the third location fulfilling a proximity criterion. In one embodiment, the method further comprises indicating the second proximity value and or third proximity value fulfilling a proximity criterion. In one embodiment, the method further comprises generating a first contour around the first waypoints and first route vertices corresponding to a plurality of the first proximity value and providing data to the display driver to display a first contour line representative of the first contour. In one embodiment, the method further comprises generating a first contour around the first waypoints and first route vertices corresponding to a plurality of the first proximity value and providing data to the display driver to display a region bounded by the first contour comprising a pattern or colour visually distinct from the remainder of the image. In one embodiment, the method further comprises generating a second contour around the third location corresponding to a plurality of the second proximity value and providing data to the display driver to display a second contour line representative of the second contour. In one embodiment, the method further comprises generating a second contour around the third location corresponding to the second proximity value and providing data to the display driver to display a region bounded by the second contour comprising a pattern or colour visually distinct from the remainder of the image. In one embodiment, the method further comprises generating a third contour around the third location corresponding to the third proximity value and providing data to the display driver to display a third contour line representative of the third contour. In one embodiment, the method further comprises generating a third contour around the third location corresponding to the second proximity value and providing data to the display driver to display a region bounded by the third contour comprising a pattern or colour visually distinct from the remainder of the image. In one embodiment, the first proximity value is representative of a geospatial distance and the first proximity value criterion is a geospatial distance. In one embodiment, the database comprises plural individually accessible databases.

BRIEF DESCRIPTION OF FIGURES

One or more examples in accordance with aspects of the claimed subject matter will now be described, by way of non-limiting example only, and with reference to the accompanying drawings, in which:

FIG. 3 is a schematic illustration of an object data structure for a system in accordance with an example of the claimed subject matter;

FIG. 4 is a schematic illustration of an object data structure for vertices of a route to be displayed in accordance with an example of the claimed subject matter;

FIG. 5 is a schematic illustration of an object data structure for vertices of another route to be displayed in accordance with an example of the claimed subject matter;

DETAILED DESCRIPTION

Figure 1:
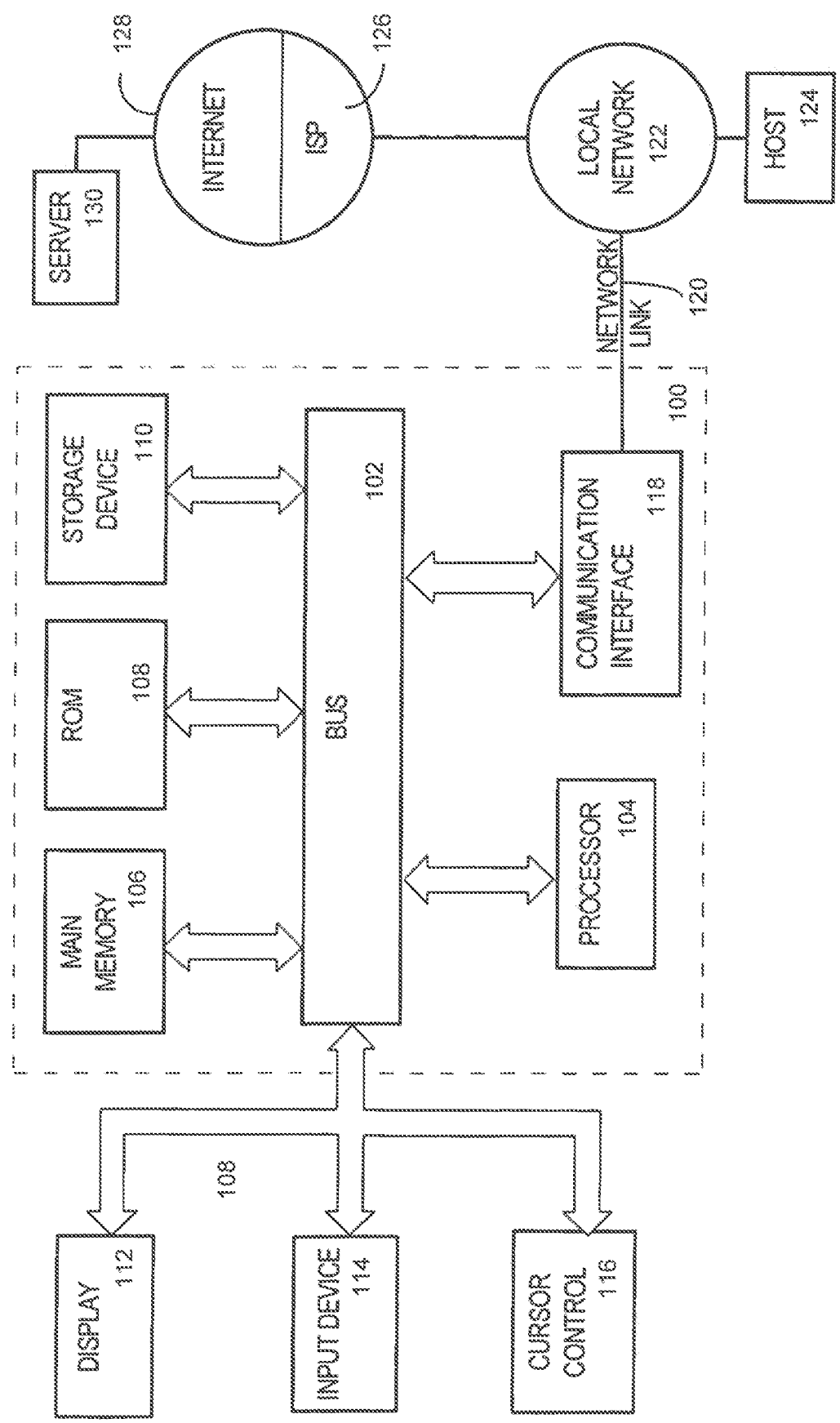
FIG. 1 is a schematic illustration of a system in accordance with an example of the claimed subject matter.

In general outline, in a first aspect, the following discloses a computer system, configured to receive two or more instances of a first route object comprising a geotemporal attribute comprising geospatial and temporal data to define an instance of the first route object, map the two or more instances of the first route object on to digital map data to define respective first route vertices in the digital map; and receive user input defining an interval and applying the defined interval intermediate chronologically adjacent respective first route vertices to define first waypoints between the respective first object vertices, thereby defining a first journey object.

Also, in general outline, the following discloses in a second aspect a method for operating computer system, the method comprising receiving two or more instances of a first route object comprising a geotemporal attribute comprising geospatial and temporal data to define an instance of the first route object, mapping the two or more instances of the first route object on to digital map data to define respective first route vertices in the digital map; and receiving user input defining an interval and applying the defined interval intermediate chronologically adjacent respective first route vertices to define first waypoints between the respective first route vertices, thereby defining a first journey object.

The first and second aspects may provide the definition of the first journey object through just two instances of the first route object. The first waypoints may provide detail for the first journey object and may need only be stored while the first journey object is being utilised or analysed, for example. The definition of the first journey object by just two or more instances of the first route object may reduce memory storage overhead when the first journey object is not being utilised and analysed as there is less to store and also there will be less data to transmit over networks and hence less bandwidth will be required compared to the data for the first journey object which will comprise the first route vertices and first waypoints.

Additionally, the interval between waypoints may be different not only in magnitude but also in dimension, e.g. the interval may be spatial or temporal. Thus, defining by only a reduced set of instances and interpolating between respective instances provides for the creation of a great many different instances of the first journey object yet still keeping storage and bandwidth requirements low. Thus, there is a clear technical result comprised in the first and second aspects.

Optionally, the two or more instances of the first route object are received from a database comprising a plurality of route objects comprising the geotemporal attribute comprising geospatial and optionally temporal data to define an instance of each of the plurality of first route objects within the database. Optionally, the two or more instances of the first route object may be supplied by user input. Optionally, a one of the two or more instances of the first route object may be supplied from the database and the other supplied from user input. Providing a system and method in which the two or more instances may be user input, stored and input from a database or a combination of both may reduce storage overhead yet further.

Typically, the data is supplied to a display driver to configure a display screen coupled to the computer system to display a map image representative of the digital map data; and display in the image a first indicium representative of the first route object at respective first route vertices. Thus, a visual display comprising a relative positioning of data points within a contextual environment may be provided to a user in order to facilitate a user reviewing the data in a manner that may mitigate or ameliorate any reduction of compromise in their visual perception or be in accordance with a preferred visual arrangement to enhance a user's visual perception and hence cognitive ability to manipulate and understand the information represented by the route vertices and waypoints. By displaying indicia specific to the first route vertices the first route vertices may be distinguished from other displayed data.

Suitably, the waypoints may be defined along a direct path between chronologically adjacent respective route vertices, first route vertices or otherwise. Optionally, the waypoints may be defined along a shortest path between chronologically adjacent respective first route vertices, first route vertices or otherwise, having regard to the curvature of the Earth.

A first waypoint object may be instantiated comprising a geotemporal attribute comprising geospatial and temporal data to define the respective first waypoints. Although way points (and also route vertices) need not be based on object structured data it is a one of a number of suitable structures.

The geotemporal attribute of the first waypoint object instance may have assigned to it first waypoint object instance geospatial data and optionally first waypoint object instance temporal data respectively derived from geospatial data and temporal data of one or both of the chronologically adjacent respective first route vertices. Thus, the waypoints may only comprise temporal data if a temporal based analysis is to be performed, thereby saving on memory storage and processing and hence energy consumption. Alternatively, the geotemporal attribute of the first waypoint object instance may have assigned to it first waypoint object instance temporal data and optionally first waypoint object instance geospatial data respectively derived from geospatial data and temporal data of one or both of the chronologically adjacent respective first route vertices. Thus, the waypoints may only comprise geospatial data if a geospatial or spatial based analysis is to be performed.

The first waypoints may be defined as a property of a locus defined by the respective first route vertices. Such may be regarded as a vector type definition of a journey defined by the first route vertices. Utilising a vector type definition may further reduce the amount of data storage required. Typically, the first waypoint object instance is stored in the database.

Generally, data is provided to display driver to configure the display screen to display in the map image first waypoint indicia representative of the first waypoint object at respective first waypoints. By displaying indicia specific to the first waypoint the first waypoints may be distinguished from other displayed data.

In a particular arrangement two or more instances of a second route object are received and mapped on to digital map data to define respective second route vertices in the digital map; and user input defining an interval may be received and applied intermediate chronologically adjacent respective second route vertices to define second waypoints between the respective second route vertices. Such a particular arrangement allows for the input of second route data which may provide for comparison with the first route data, including both vertices and waypoints as may be generated.

Optionally, the two or more instances of the second route object are received from a database comprising a plurality of route objects comprising the geotemporal attribute comprising geospatial and optionally temporal data to define an instance of each of the plurality of second route objects within the database. Optionally, the two or more instances of the second route object may be supplied by user input. Optionally, a one of the two or more instances of the second route object may be supplied from the database and the other supplied from user input. Providing a system and method in which the two or more instances may be user input, stored and input from a database or a combination of both may reduce storage overhead yet further.

Again, typically the data is supplied to a display driver to configure a display screen coupled to the computer system to display in the map image a second indicium representative of the second route object at respective second route vertices. Thus, a visual display comprising a relative positioning of data points within a contextual environment may be provided to a user in order to facilitate a user reviewing the data in a manner that may mitigate or ameliorate any reduction of compromise in their visual perception or be in accordance with a preferred visual arrangement to enhance a user's visual perception and hence cognitive ability to manipulate and understand the information represented by the route vertices and waypoints. By displaying indicia specific to the second route vertices the second route vertices may be distinguished from other displayed data, for example first route vertices.

Suitably, the waypoints may be defined along a direct path between chronologically adjacent respective second route vertices. Optionally, the waypoints may be defined along a shortest path between chronologically adjacent respective second route vertices having regard to the curvature of the Earth.

A second waypoint object may be instantiated comprising a geotemporal attribute comprising geospatial and temporal data to define the respective second waypoints. Although way points (and also route vertices) need not be based on object structured data it is a one of a number of suitable structures.

The geotemporal attribute of the second waypoint object instance may have assigned to it second waypoint object instance geospatial data and optionally second waypoint object instance temporal data respectively derived from geospatial data and temporal data of one or both of the chronologically adjacent respective second route vertices. Thus, the waypoints may only comprise temporal data if a temporal based analysis is to be performed, thereby saving on memory storage and processing and hence energy consumption. Alternatively, the geotemporal attribute of the second waypoint object instance may have assigned to it second waypoint object instance temporal data and optionally second waypoint object instance geospatial data respectively derived from geospatial data and temporal data of one or both of the chronologically adjacent respective second route vertices. Thus, the waypoints may only comprise geospatial data if a geospatial or spatial based analysis is to be performed.

The second waypoints may be defined as a property of a locus defined by the respective second route vertices. Such may be regarded as a vector type definition of a journey defined by the second route vertices. Utilising a vector type definition may further reduce the amount of data storage required. Typically, the second waypoint object instance is stored in the database.

Generally, data is provided to a display driver to configure the display screen to display in the map image second waypoint indicia representative of the second waypoint object at respective second waypoints. By displaying indicia specific to the second waypoint the second waypoints may be distinguished from other displayed data.

Optionally, a first proximity value may be determined, the first proximity value representative of the proximity of a one of the second waypoints or a one of the respective second route object vertices to a one of the first waypoints or a one of the respective first route object vertices fulfilling a first proximity criterion. Typically, there is an indication of the first proximity value fulfilling the first proximity criterion, for example an alert of indicium indication the same.

In one example, there may be retrieved from the database, or input by a user, an instance of a third object comprising a geotemporal attribute comprising geospatial and temporal data and to map the geospatial data of the third object on to the digital map data to define a third location in the digital map, wherein the instance of the third object further comprises an event attribute and the temporal data corresponds to a time of an occurrence of an event corresponding to the event attribute. Suitably, data may be provided to the display driver to configure the display screen to display in the map image a third indicium representative of the third object at the third location.

In such a one example, a second proximity value may be determined, the second proximity value representative of the proximity of a one of the first waypoints or first route object vertices to the third location and or a third proximity value determined representative of a one of the second waypoints or second object vertices to the third location fulfilling a proximity criterion. Thus, it may be determined how close a first journey or second journey passes the third location. Typically, an indication of the second proximity value and or third proximity value fulfilling a proximity criterion is provided.

A first contour around the first waypoints and first route vertices corresponding to a plurality of the first proximity value may be generated and data provided to the display driver to display a first contour line representative of the first contour. Such a display may provide a visual representation that may enhance perceptual cognition of a user and may compensate for difficulty in such perceptual cognition.

A first contour around the first waypoints and first route vertices may be generated corresponding to a plurality of the first proximity value and data provided to the display driver to display a region bounded by the first contour comprising a pattern or colour visually distinct from the remainder of the image. Such a display may provide a further and different visual representation that may enhance perceptual cognition of a user and may compensate for a similar or different difficulty in such perceptual cognition.

A second contour around the second waypoints and second route vertices corresponding to a plurality of the second proximity value may be generated and data provided to the display driver to display a second contour line representative of the second contour. Such a display may provide a visual representation that may enhance perceptual cognition of a user and may compensate for difficulty in such perceptual cognition.

A second contour around the second waypoints and second route vertices may be generated corresponding to a plurality of the second proximity value and data provided to the display driver to display a region bounded by the second contour comprising a pattern or colour visually distinct from the remainder of the image. Such a display may provide a further and different visual representation that may enhance perceptual cognition of a user and may compensate for a similar or different difficulty in such perceptual cognition.

A third contour may be generated around the third location corresponding to the third proximity value and data provided to the display driver to display a third contour line representative of the third contour.

A third contour may be generated around the third location corresponding to the second proximity value and data provided to the display driver to display a region bounded by the third contour comprising a pattern or colour visually distinct from the remainder of the image.

The first and or second proximity value may be representative of a geospatial distance and the first and or second proximity value criterion a geospatial distance.

The first and or second proximity value may be representative of a temporal distance and the first and or second proximity value criterion a temporal distance.

The database may comprise plural individually accessible databases. One or more of the plural individually accessible databases may be on different hardware platforms and or in different physical or geographic locations.

FIG. 1 is a block diagram that illustrates a computer system 100 upon which an embodiment of the invention may be implemented. Computer system 100 includes a bus 102 or other communication mechanism for communicating information and instructions, and a processor 104 coupled with bus 102 for processing information and executing instructions. Computer system 100 also includes a main memory 106, such as a random access memory (RAM) or other dynamic storage device, coupled to bus 102 for storing information and instructions to be executed by processor 104. Main memory 106 also may be used for storing temporary variables or other intermediate information during execution of instructions to be executed by processor 104. Computer system 100 further includes a read only memory (ROM) 108 or other static storage device coupled to bus 102 for storing static information and instructions for processor 104. A storage device 110, such as a magnetic disk or optical disk, is provided and coupled to bus 102 for storing information and instructions.

Computer system 100 may be coupled via bus 102 to a display 112, such as a cathode ray tube (CRT), liquid crystal or plasma display, for displaying information to a computer user. An input device 114, including alphanumeric and other keys, is coupled to bus 102 for communicating information and command selections to processor 104. Another type of user input device is cursor control 116, such as a mouse, a trackball, or cursor direction keys for communicating direction information and command selections to processor 104 and for controlling cursor movement on display 112. This input device typically has two degrees of freedom in two axes, a first axis (e.g., x) and a second axis (e.g., y), that allows the device to specify positions in a plane.

Aspects and embodiments of the invention are related to the use of computer system 100 for implementing the techniques described herein. According to one embodiment of the invention, those techniques are performed by computer system 100 in response to processor 104 executing one or more sequences of one or more instructions contained in main memory 106. Such instructions may be read into main memory 106 from another machine-readable medium, such as ROM 108 and/or storage device 110. Execution of the sequences of instructions contained in main memory 106 causes processor 104 to perform the process steps described herein. In optional embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 100, various machine-readable media are involved, for example, in providing instructions to processor 104 for execution. Such a medium may take many forms, including but not limited to, non-volatile media, volatile media, and transmission media.

Non-volatile media includes, for example, optical or magnetic disks, such as storage device 110. Volatile media includes dynamic memory, such as main memory 106. Transmission media includes coaxial cables, copper wire and fibre optics, including the wires that comprise bus 102. Transmission media can also take the form of acoustic or light waves, such as those generated during radio wave and infrared data communications. Such media is tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 104 for execution. For example, the instructions may initially be carried on a magnetic disk of a remote computer. The remote computer can load the instructions into its dynamic memory and send the instructions over a telephone line using a modem. A modem local to computer system 100 can receive the data on the telephone line and use an infrared transmitter to convert the data to an infrared signal. An infrared detector can receive the data carried in the infrared signal and appropriate circuitry can place the data on bus 102. Bus 102 carries the data to main memory 106, from which processor 104 retrieves and executes the instructions. The instructions received by main memory 106 may optionally be stored on storage device 110 either before or after execution by processor 104.

Computer system 100 also includes a communication interface 118 coupled to bus 102. Communication interface 118 provides a two-way data communication coupling to a network link 120 that is connected to a local network 122. For example, communication interface 118 may be an integrated services digital network (ISDN) card or a modem to provide a data communication connection to a corresponding type of telephone line. As another example, communication interface 118 may be a local area network (LAN) card to provide a data communication connection to a compatible LAN. Wireless links may also be implemented. In any such implementation, communication interface 118 sends and receives electrical, electromagnetic or optical signals that carry digital data streams representing various types of information.

Network link 120 typically provides data communication through one or more networks to other data devices. For example, network link 120 may provide a connection through local network 122 to a host computer 124 or to data equipment operated by an Internet Service Provider (ISP) 126. ISP 126 in turn provides data communication services through the worldwide packet data communication network now commonly referred to as the "Internet" 128. Local network 122 and Internet 128 both use electrical, electromagnetic or optical signals that carry digital data streams. The signals through the various networks and the signals on network link 120 and through communication interface 118, which carry the digital data to and from computer system 100, are example forms of carrier waves transporting the information.

Computer system 100 can send messages and receive data, including program code, through the network(s), network link 120 and communication interface 118. In the Internet example, a server 130 might transmit a requested code for an application program through Internet 128, ISP 126, local network 122 and communication interface 118.

The received code may be executed by processor 104 as it is received, and/or stored in storage device 110, or other non-volatile storage for later execution. In this manner, computer system 100 may obtain application code in the form of an earner wave.

Figure 2:
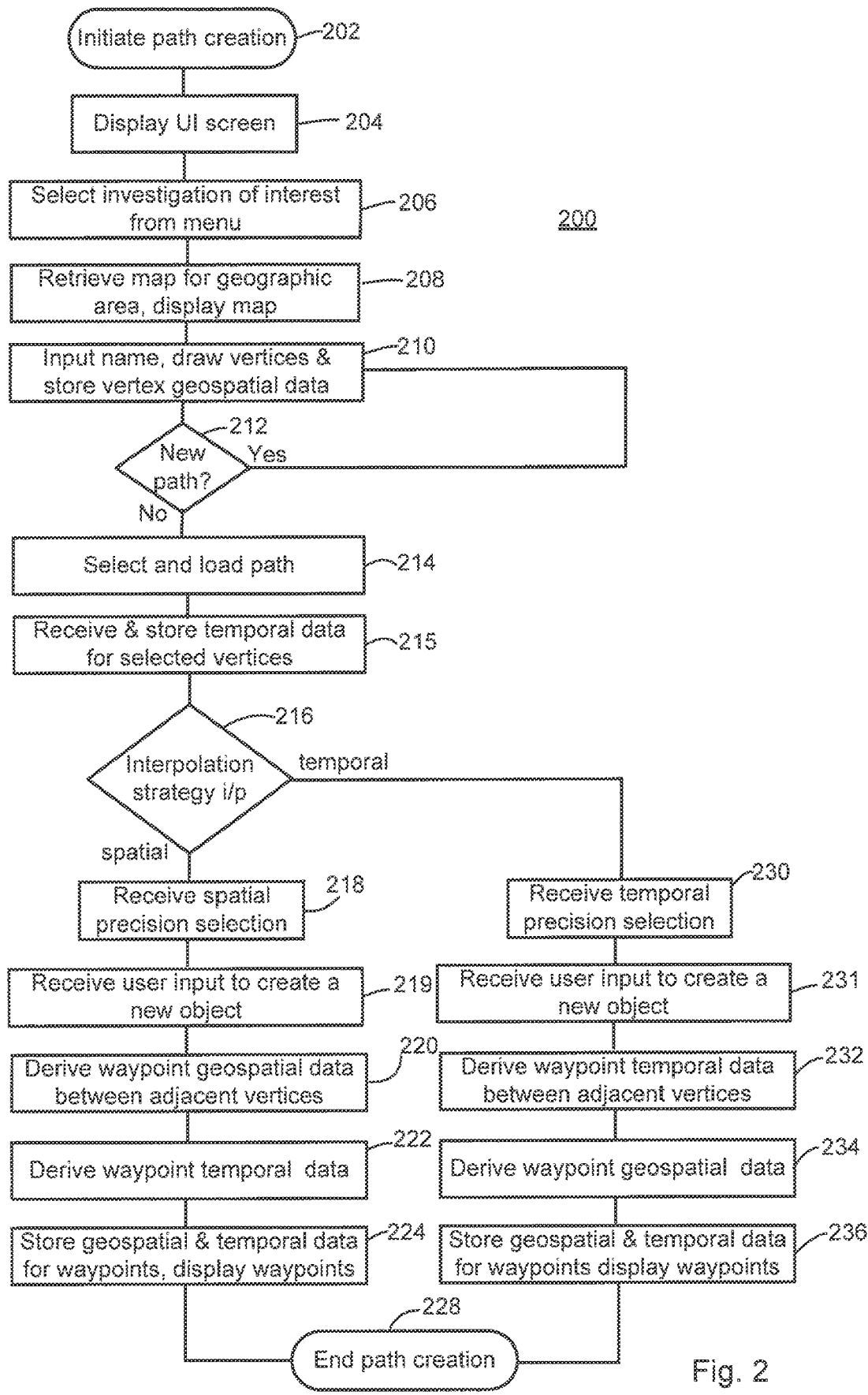
FIG. 2 is a process flow control diagram for controlling a system in accordance with an example of the claimed subject matter.
Figure 6:
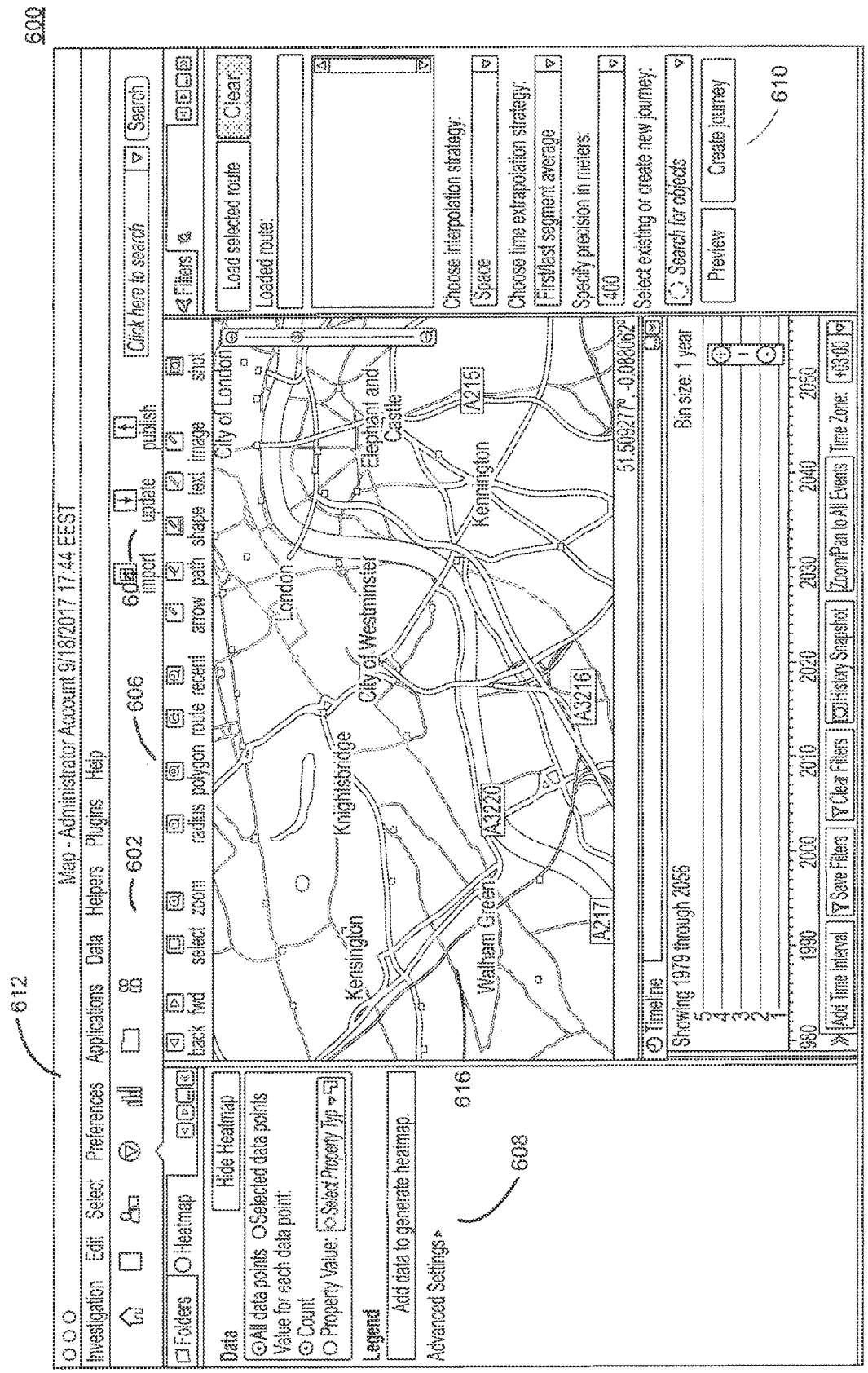
FIG. 6 is a schematic illustration of a first user interface display for an example of the claimed subject matter.

Turning now to FIG. 2, there is illustrated a procedure control flow diagram in accordance with an embodiment of the described invention. The procedure 200 illustrated in FIG. 2 is for the initial creation of a path drawn onto a map displayed on display 112. A user, through input device 114, may invoke, 202, the path creation procedure 200 causing the computer system to retrieve from main memory 106 the instructions for initiating the path creation procedure, 200. The instructions retrieved from main memory 106 are executed, 204, by processor 104 to display a user interface screen on display 112. An example of such a user interface screen is illustrated in FIG. 6 as reference 600 and illustrates various user actuatable icons, 602, 604, 606, 608 and 610 for example, as well as pulldown menus 612 for controlling the input, display and storage of data input, created and displayed during the path creation procedure 200.

The instructions executed by processor 104 provide a pull down menu, "Investigation", from the pull down menus 612 and which provides a list of investigations which may be selected. Responsive to user selection 206 of an investigation in the drop down menu, processor 104 executes instructions, 208, to retrieve from a bulk memory, e.g. storage device 110, digital map data and to display the digital map data as a map 616 of a geographic region corresponding to the selected investigation. In this embodiment, selection of an investigation is merely to identify a geographic region the subject of any investigation. However, in other embodiments, selection of an investigation may set additional or other parameters.

Processor 104 may then execute instructions 210 to receive the input of geospatial data onto the map 616 in order to define the geolocation of respective vertices by drawing a point on the map 616 corresponding to respective vertex location. In the described embodiment processor 104 executed instructions to receive various parameters for the geospatial data that are input by a user, for example the colour of the vertices and route to be displayed may be selected by activating user actuable icon 712 in user interface 700 and a name assigned to the path that is being created, in this case "Blue journey" and displayed as a presentation layer 714. Assigning of a name may comprise linking the path to an entity having traversed the route defined by the path. For example, the path may be linked to a person under surveillance. In the present disclosure the terms "path", "route", and "journey" may be used interchangeably or to refer to different parts or status of an object according to context.

Figure 7:
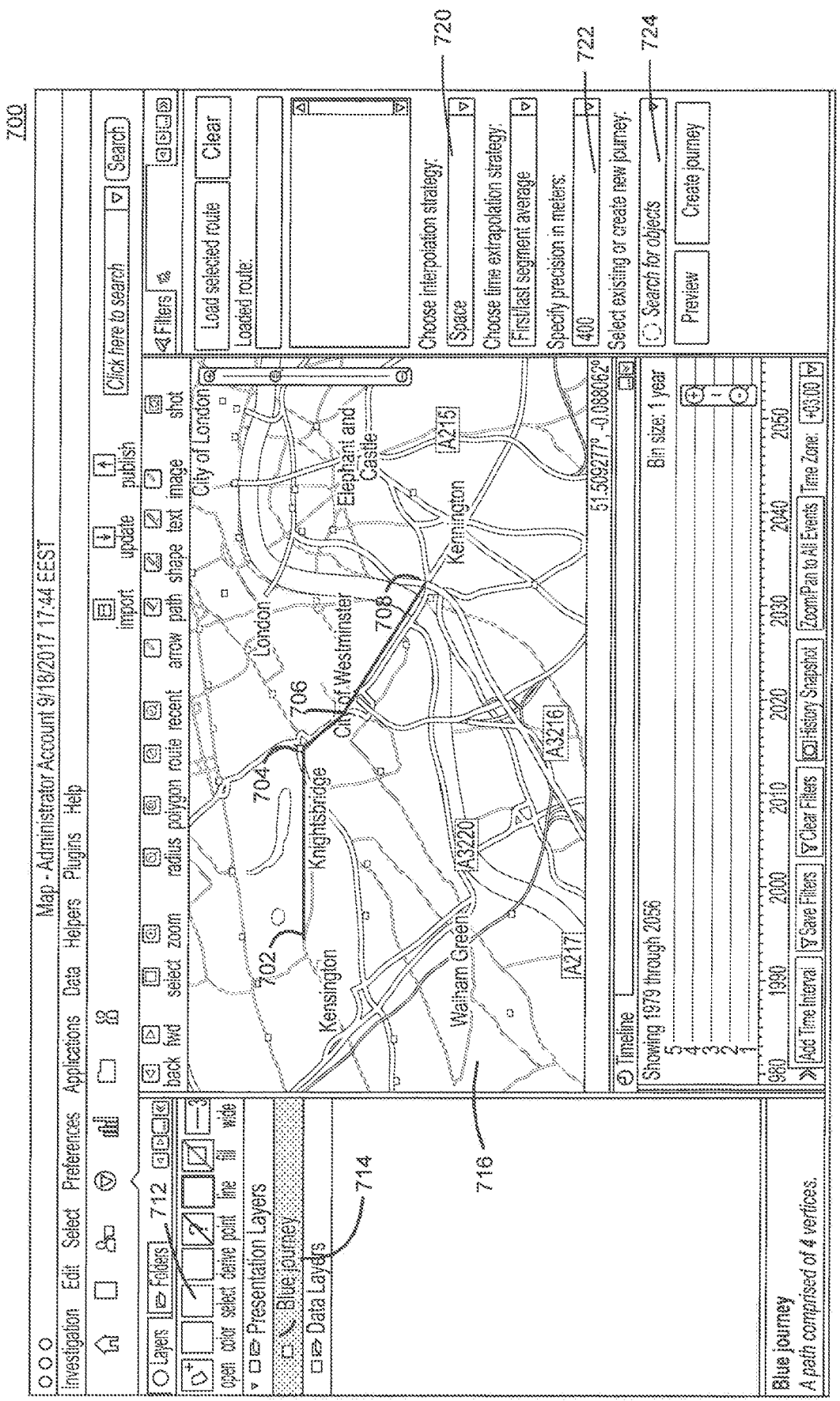
FIG. 7 is a schematic illustration of a second user interface display for an example of the claimed subject matter.

Referring to FIG. 7, a vertex, 702, 704, 706 and 708, may be illustrated on map 716 by way of a point or a dot or other simple indicium. In an illustrative embodiment, a user may input an indicium defining a vertex utilising cursor control device 116, for example a so-called "mouse" or "mouse pad". The cursor control device 116 may be user actuated to move a displayed cursor over map 716 and processor 104 execute instructions such that a "left click" on a mouse button or similar user gesture will draw a vertex indicium at the cursor position when the user made the "left click". In this way a user may define a number of different vertices within the map 716. A final vertex in a sequence of vertices may be indicated by "double left clicking" at a position on the map corresponding to where the final vertex is to be displayed. Optionally, one or more vertices may have their geolocation defined by entering geospatial data explicitly into an input field of the user interface 700.

Each vertex is an instance of an object's location in the geographic region represented by the digital map 716. In the described embodiment, the vertices represent respective instances along a route taken by an entity. Thus, each vertex is an instance of a route traversed by a route object corresponding to the entity.

Therefore, in the described embodiment the object is of a type "route". The object 300 has a data structure as illustrated in FIG. 3.

In the described embodiment, data structure 300 illustrated in FIG. 3 comprises four attributes: object type 302; object ID 304; geospatial data 306; and temporal data 308. Object type identifies the object type to distinguish it from other object types and in the illustrated example object 300 is of type "route". The object ID 304 is the name of the relevant entity, 305, and in the described example is named "Blue". Object ID 304 may also comprise a path name, 307, in order to distinguish different paths by the same entity, particularly if more than one path by the same entity is to be analysed on the same map at the same time. The next attribute is geospatial data 306. Geospatial data comprise the geographic coordinates of the particular instance of the object defined in the data structure. In the described example the geospatial data comprises longitude and latitude, the respective values being separated by suitable delimiter such as a "," or ";". Optionally, the geospatial data may be in another suitable geographic coordinate system. In the described embodiment the final attribute is temporal data 408. Temporal data provides the time at which the object ID occupied the geographic space defined by the geospatial data 306. For any specific object, the geospatial data and temporal data, sometimes referred to as "geo-temporal data" defines an instance of that specific object, i.e. an object identified by a particular object ID and object type.

It will be appreciated that the data structure illustrated in FIG. 3 is an example only and one or more embodiments may comprise a data structure having greater or possibly fewer respective attributes, and which may be structured in an arrangement different from that illustrated.

Returning now to step 210 of the procedure flow control diagram illustrated in FIG. 2, processor 104 executes instructions which stores an object of type "path" by storing the geospatial data corresponding to the position at which a vertex has been drawn on digital map 616 into a data structure 400 for the path type object.

FIG. 4 illustrates a data structure 400 in accordance with an embodiment of the present disclosure in which the geospatial data of respective vertices for the Blue journey is stored together with the object type "route", an identifier of the object type and Object ID. Each group, 402-408, of object type, Object ID, and geospatial data correspond to geospatial data geo702, geo704, geo706 and geo708 respectively of the Blue journey.

Processor 104 then executes instructions, step 212 causing processor 104 to respond to initiation of a new path by executing instructions to return the procedure flow control to step 210 where vertices for a further path may be input into the system. Initiation of vertices for a further path may be indicated merely by single clicking a cursor control device such as a mouse to display a vertex at the cursor position when the control device was clicked, and so on and so forth as described above when first referring to step 210.

Figure 8:
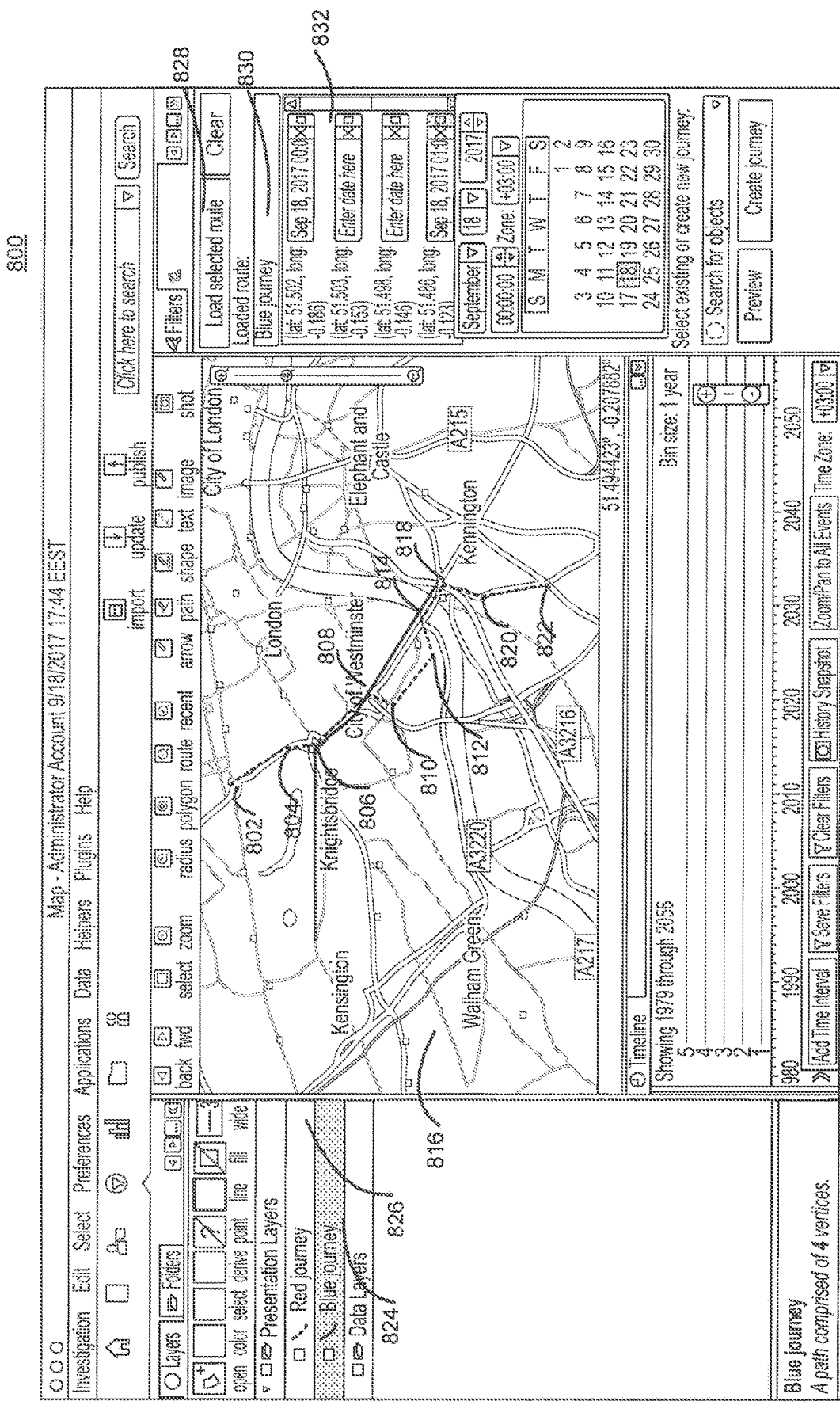
FIG. 8 is a schematic illustration of a third user interface display for an example of the claimed subject matter.

FIG. 8 illustrates a second route 800, named "Red journey" (shown in dotted outline), input to the digital map display 816 through a second traversal of step 210. The vertices are labelled 802 through 814 and 881 through 822.

FIG. 5 illustrates a data structure 500 storing geospatial data of the second journey corresponding to respective vertices.

If no new path is to be generated procedure flow control proceeds to step 214 at which processor 104 executes instructions to receive user input to select a path for further processing and/or analysis. Such user input comprises selecting a one of the journeys displayed in the "Presentation Layers" display fields 824 and 826 and activating the selection, suitably by way of a "double click" on a cursor control device 116 such as a computer interface mouse. Processor 104 continues to execute instructions to receive user input actuating display icon 828 to load the selected journey. The loaded journey is displayed in display field 830.

The procedure flow control proceeds to step 215 at which the processor 104 executes instructions to receive user input at display field 832 to define a time for respective one or more vertices. Temporal data need not be input for every vertex but could be input for just a single one of the vertices. In the embodiment described herein, temporal data is input for the first vertex, 702, and last vertex, 708, of the Blue journey. Thus, data structure 500 would have temporal data, t802 and t808, stored for respective entries 502 and 508.

Figure 9:
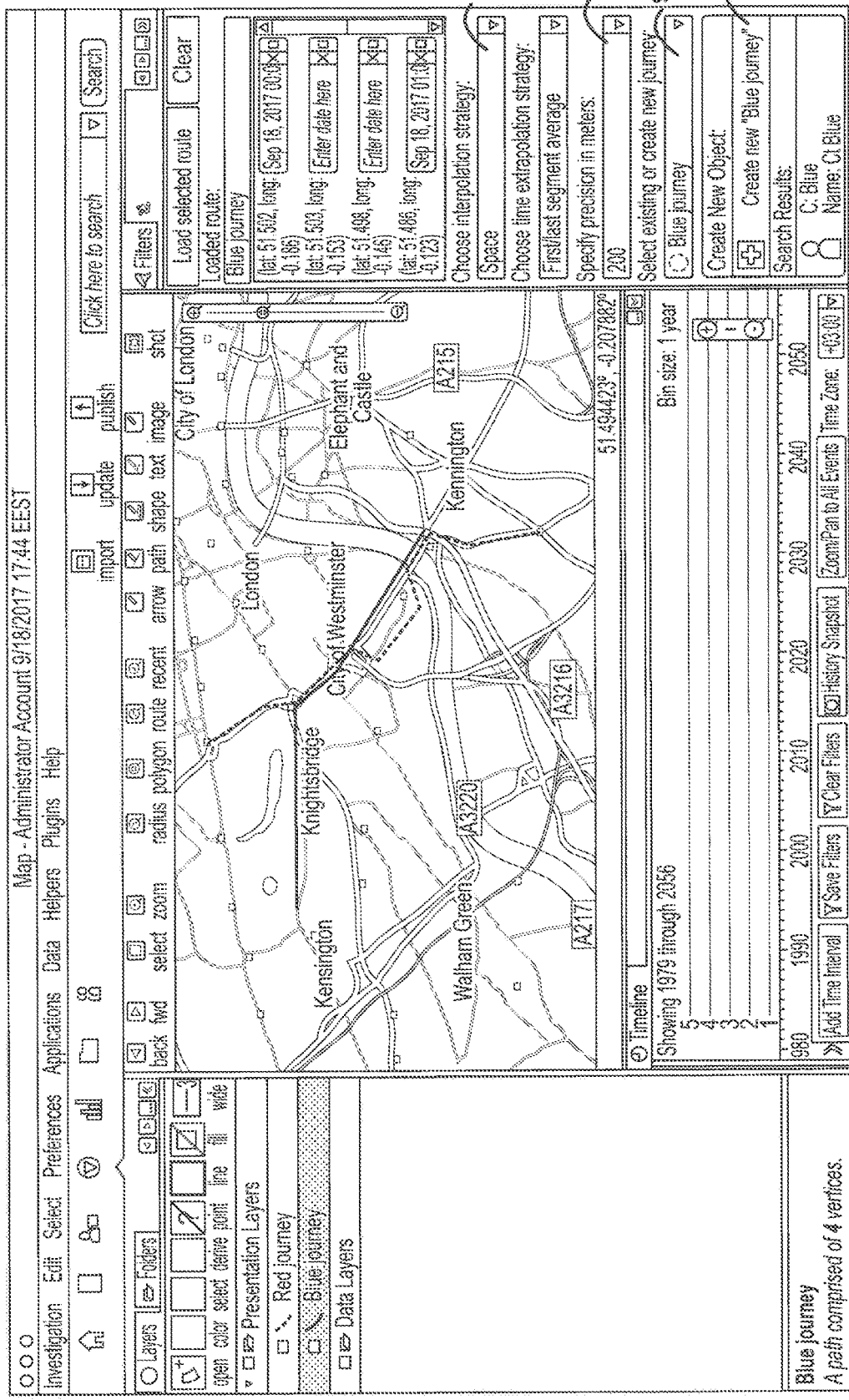
FIG. 9 is a schematic illustration of a fourth user interface display for an example of the claimed subject matter.

Procedure flow control then flows to step 216 at which processor 104 executes instructions for receiving user input to select an interpolation strategy by selection of an option from pull down options of display field 902 of display interface 900 illustrated in FIG. 9. Responsive to selection of spatial interpolation procedure control flows to step 218 and processor 104 receives user input to select an option from display field 904 setting the precision of interpolation. In the illustrated embodiment the precision is selected to be 200 m.

Processor 104 then executes instructions to move procedure flow control to step 219 to receive user input to select an existing Journey object or create a new object within the system corresponding to the selected route. In the described example, a new object is to be created instantiating the Blue journey. The new object is created by entering the name of the route it is desired to create as a new object in to display field 906 and actuating user actuable display icon 908 to create the new object named "Blue journey". Instantiating a new object moves the route or path from a presentation layer comprising the path as displayed on the map to an object having an Object ID as set out in the data structures 400 and 500 and capable of analysis in the system. Creation of the new object "Blue Journey" results in processor 104 executing instructions to move procedure flow control to step 220 at which the processor 104 executes instructions to calculate waypoints, also referred to as "journey points", along the selected route, i.e. Blue journey, at a 200 m precision previously defined by the user at step 218.

In the described embodiment, processor 104 executes instructions to move procedure control to step 222 at which step temporal data for respective waypoints is calculated. Processor 104 then executes instructions to store the geospatial and temporal data for each waypoint and to display the waypoints, step 224 see FIG. 10 references 1006 and 1008 in which indicium 1006 are plain triangles representing the Blue route and the crossed triangle are the indicium representing the Red route. At step 224 processor 104 also executes instructions to display a display interface 1000 including user selectable options for the indicium used to indicate a waypoint which in the described embodiment comprises the shape 1010 and colour 1011 of the indicium. If no colour is selected the system defaults to the same colour as the line.

In the described disclosure the waypoints, 1006 and 1008, are calculated between chronologically adjacent vertices using linear interpolation adjusted for the curvature of the Earth. In the described disclosure the waypoints 1006 and 1008 are created so that they are distributed evenly between the two adjacent vertices in both temporal and geospatial dimensions. If a single waypoint were to be created it would be disposed exactly between the two adjacent vertices in both the temporal and geospatial dimensions. Respective records for each waypoint may be stored in a structure similar to that shown in FIG. 15. Each waypoint is related to a particular Object ID, in the illustrated case "Red 1" and has the object type "waypoint" and geotemporal data stored in respective records. Path creation ceases at step 228.

Optionally, a user may input temporal data for one or more of the vertices additional to the start and end vertices. Such data is input by placing a display pointer, such as a cursor or other indicium, under control of a pointing device, a mouse for example, over the vertex for which temporal data is to be input in order to highlight the latitude and longitude values of the display interface to activate the corresponding displayed input field 830 of display 800 illustrated in FIG. 8. The addition of further temporal data may be a part of the path creation procedure or may be after the path creation procedure has stopped.

Figure 10:
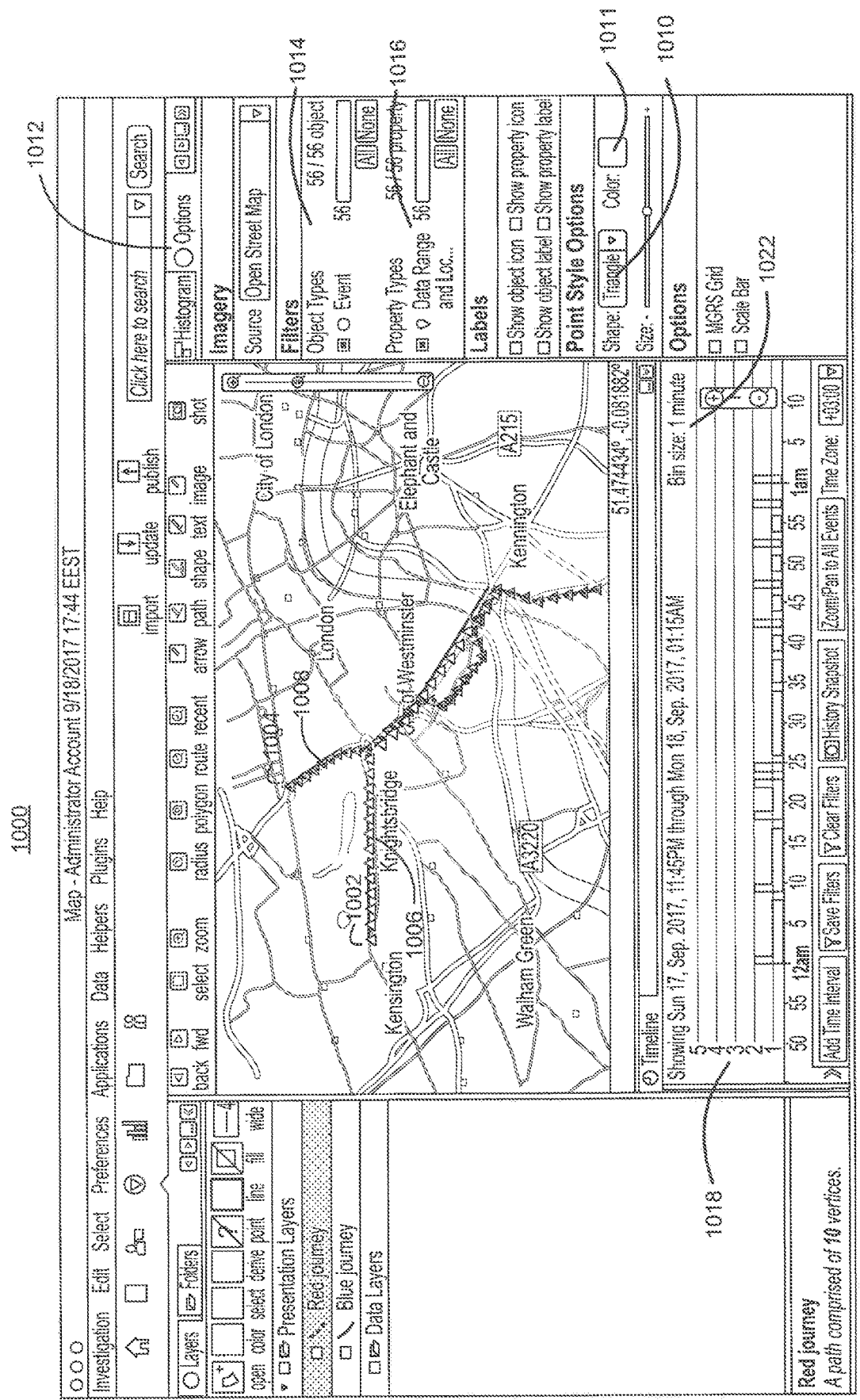
FIG. 10 is a schematic illustration of a fifth user interface display for an example of the claimed subject matter.

The display 1000 illustrated in FIG. 10 shows both the Blue journey 1002 and the Red journey 1004.

If temporal interpolation is selected at step 216, processor 104 executes instructions to receive user input of the temporal precision to be applied to the calculation of waypoints, step 230, and then to receive input selecting an existing journey object or to create a new one, step 231, which in the described disclosure is the Blue journey. For selection of temporal interpolation, temporal waypoints are derived at step 232 and optionally geospatial way point data at step 234. Processor 104 then executes instructions, step 236, to store the temporal and geospatial data as appropriate and to display them on the map. At step 236, the user may also select the type of way point indicium, in this case a triangle which will be coloured blue. A similar process would be undertaken for creating the Red journey using temporal interpolation. Path creation ceases at step 228.

The foregoing describes the creation of a journey object and waypoints at a user selected precision interval. Optionally, a user may invoke a stored journey, for example in display 700, by selecting an interpolation strategy, step 216, in display field 720, specifying the interpolation interval precision, step 218 or 230, in display field 722 and recalling a previously stored journey for analysis by inputting the name of the journey, step 219 or 232, into display field 724. In this way, a user may define the precision interval for a stored journey and instantiate it as an object for analysis.

Figure 15:
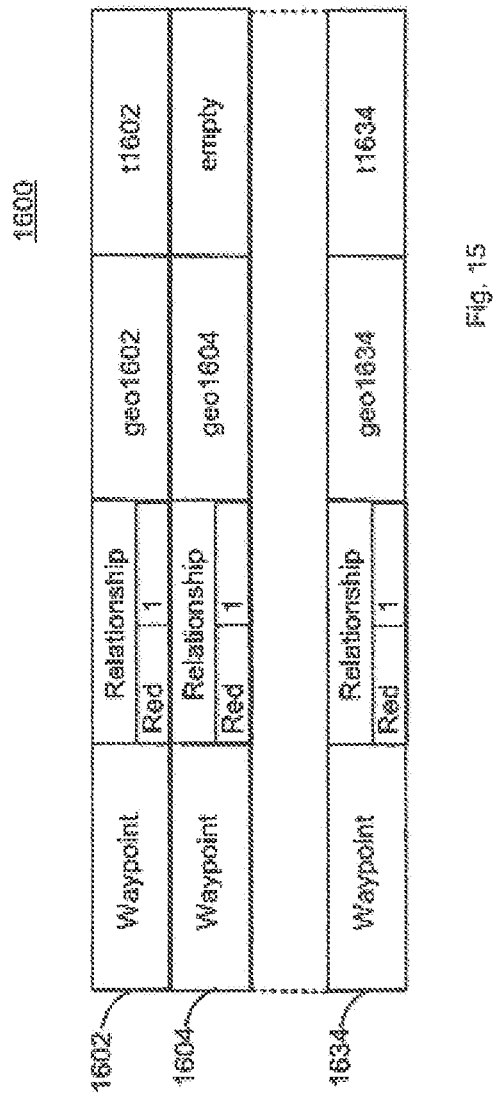
FIG. 15 is a schematic illustration of an object data structure for waypoints of a route to be displayed in accordance with an example of the claimed subject matter.

Each point in a journey, vertices and waypoints, may be its own object and linked to the journey or defined as a property of the main journey element to which it relates. In the described example, see FIG. 4 and FIG. 5, respective vertices are illustrated stored as geotemporal or just geospatial data of a specific journey object, i.e. they are properties of either the Blue 1 journey or Red 1 journey objects. However, the waypoints are stored as respective waypoint objects, each having a relationship with a journey object, as illustrated in FIG. 15.

In the described disclosure, prior to instantiating an object the relevant data, such as vertices and waypoints, is stored in memory and the user can "preview" it. However, in the described disclosure it is only after the user activating (clicking) the "Create journey" button that the object is actually instantiated.

Data input by a user and stored in a data structure such as data structures 400 and 500 will typically relate to real world observations and tracking of entities such as one or more persons or vehicles for example. The observations of entity, location and time may be derived from a report from human observers and or a surveillance system such as a closed circuit TV (CCTV) system. For a user utilising previously stored data, the data structures 400 and 500 may be populated by previous user input or may have been collected automatically by way of a CCTV system or some other surveillance system, including the use of human surveillance, monitoring the location of an entity under investigation. For example, a camera of a CCTV system may comprise image recognition capability to recognise a person or some other feature such as the vehicle registration number of a vehicle under investigation, and to record their location. A record of the recognition of the entity under investigation, the geographic location and the time at which the entity was recognised at a particular location and or within the field of view or location of the camera or surveillance operative may be uploaded to the system 100 so that a data structure 400 or 500 such as that illustrated in FIG. 4 or 5 may have a record populated with the entity identity and the geotemporal data associated with recognition of the entity. Optionally, temporal data need not be entered for each observation point. The observation points may form the vertices of a path from which a journey object is derived and instantiated, and way points created.

Having instantiated two path objects, Blue journey 1002 and Red journey 1004, a user may invoke various analytical tools to assist in the automatic identification of relationships between respective journeys.

Turning back to FIG. 10, instantiation of a journey object results in processor 104 executing instructions to invoke display of a user actuable display icon 1012 labelled "Options" to receive user definable parameters to filter what types of objects ("Journey", "Waypoint" etc), 1014, and filter property type (date range of objects of interest and geographic location, for example), 1016. In the described example illustrated with respect to FIG. 10, all object types have been selected and all properties have been selected resulting in all objects present in the display being selected.

Processor 104 executes instructions to display timeline 1018, the bin size being user selectable through operation of slider icon 1020. In the described example, the timeline display 1018 has been configured for a bin size of one minute, 1022 and displays the number of events on a map that have occurred in that minute for all the objects displayed on the map, i.e. for all journeys displayed on the map. Likewise, the proximity analysis display is invoked in a similar manner as the options menu.

Figure 11:
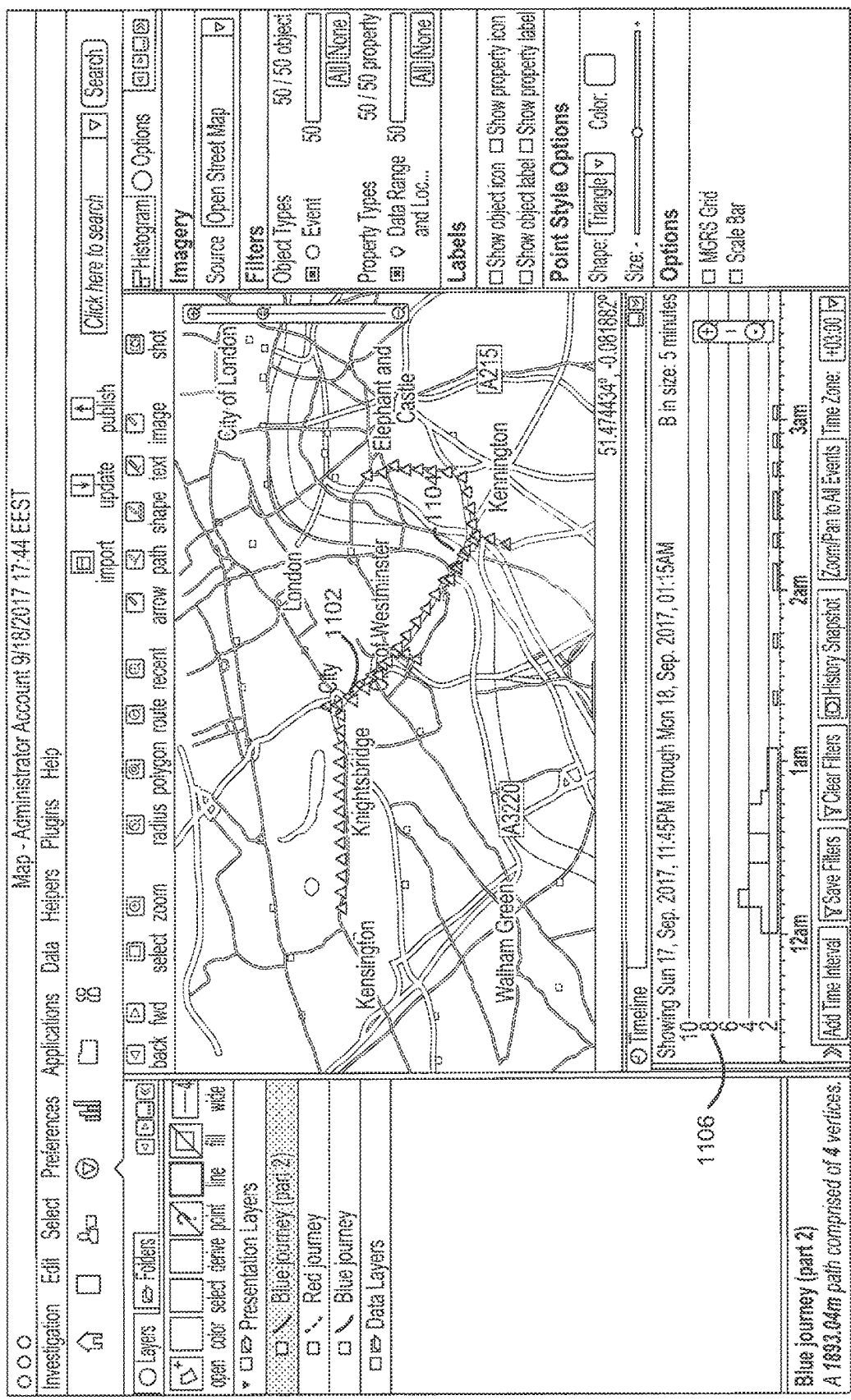
FIG. 11 is a schematic illustration of a sixth user interface display for an example of the claimed subject matter.

Turning now to FIG. 11, a display 1100 is illustrated which is generated following processor 104 executing instructions to display only those points, vertices and waypoints, of the Red 1 journey which are within a specific time, 15 minutes, and distance, 500 m, of a point, vertex or waypoint, of a journey comprising Blue 1 journey. An extension of the Blue 1 journey may be defined and added to the Blue 1 journey the combination being named as "Blue journey (part 2)". Thus, another route or more points such as vertices or waypoints may be added to an existing journey without creating, a new object. Processor 104 executes instructions which receive the time and distance proximity parameters to form criteria from a user and then invokes a routine to compare the proximity of the geospatial data of the points of the Red 1 journey with the geospatial data of the points of the Blue journey (part 2) to determine those points of the Red 1 journey which satisfy the geospatial proximity criterion to implement a first filter on the Red 1 journey points. Those Red 1 journey points and Blue journey (part 2) journey points satisfying the geospatial criterion are noted, for example by setting a flag in the geospatial element of their data structure, the setting of the flag indicating satisfaction of a geospatial criterion. Subsequent to invoking the geospatial proximity filter and noting relevant journey points, processor 104 executes instructions to implement a second filter by applying the temporal criterion to the journey points noted as satisfying the geospatial criterion. Applying the geospatial filter first followed by the temporal filter may reduce the data processing burden because only those points which satisfy the geospatial criterion undergo the temporal filtering. Such an order utilises the geocentric nature of a geographic analysis, i.e. an analysis which is focussed on the geographic location of an event.

Display 1100 display two groups of Red 1 journey points, 1102 and 1104, in which respective groups satisfy the proximity criteria. The visual display of journey points which satisfy the geotemporal criteria is useful in identify areas for further and more detailed review. Timeline display 1106 displays a histogram of events grouped by temporal proximity (in the illustrated case in 5 minute groups known as bins). In this scenario, the timeline displays, per each 5 minute bin, the number of events present on the map that happened within these 5 minutes. This may be useful to a user as they can select a bin in the timeline and processor 104 will execute instructions to highlight these events on the map and hence the user will be able to visually see whether the events have happened geographically close together.

Figure 12:
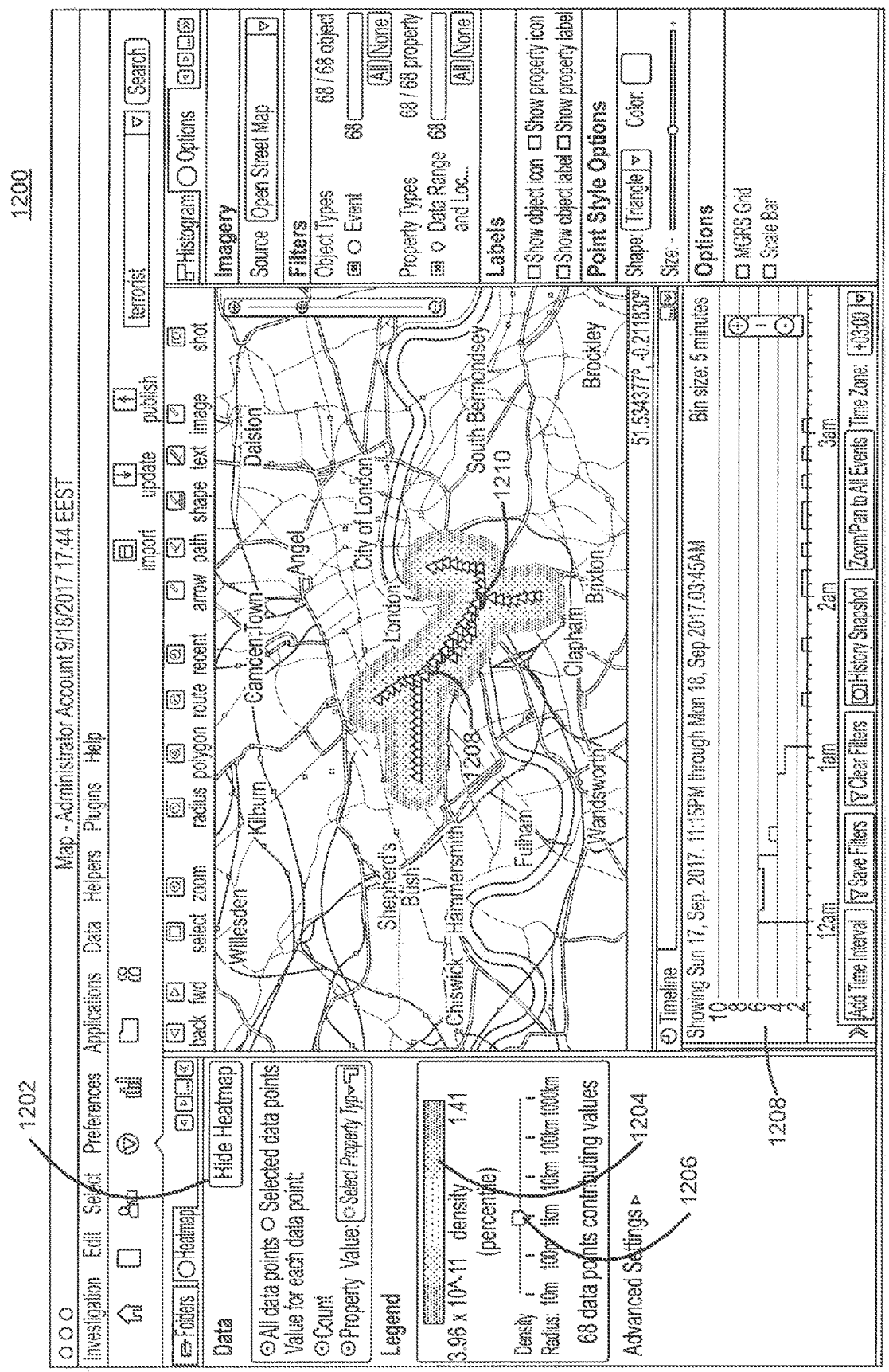
FIG. 12 is a schematic illustration of a seventh user interface display for an example of the claimed subject matter.

Turning now to FIG. 12, processor 104 also executes instructions responsive to user input selecting a "Heatmap" tab 1202 to invoke a heat map display 1200, illustrated in FIG. 12. The instructions may also cause processor 104 to display a density legend 1204 and provide a user actuable slider icon 1206 to select a density radius. A heatmap is a particularly convenient way to provide a visual representation of the number of occurrences of something, in this journey points satisfying the criteria discussed above in relation to FIG. 11. Regions 1208 and 1210 of display 1200 respectively correspond to the groups of points 1102 and 1104 of display 1100. Timeline display 1212 displays a histogram of the events that have occurred within the time periods (bins) of the histogram display.

Figure 13:
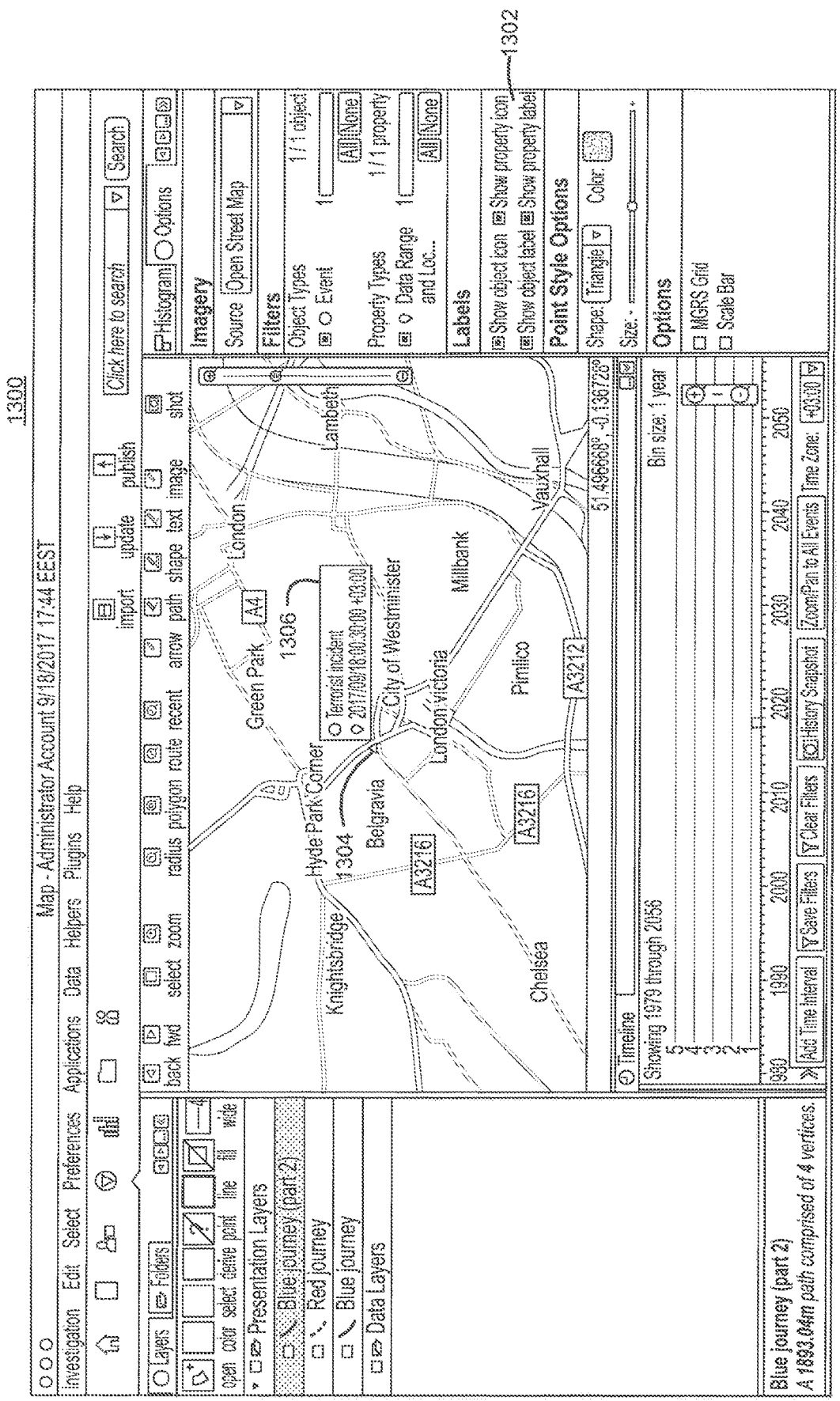
FIG. 13 is a schematic illustration of an eighth user interface display for an example of the claimed subject matter.

Processor 104 also executes instructions which provide user actuable display icons actuable to invoke a procedure to input data to create an event object. Optionally, a user may retrieve a previously created event object from memory, e.g. main memory 106, non-volatile memory device 110 and or from a network resident storage device such as via server 130. Turning now to FIG. 13, there is illustrated a display 1300 generated by processor 104 executing instructions responsive to user actuation invoking input of data for creating an event or retrieving an event from memory store. The display 1300 has user input area 1302 comprising "check boxes" actuable by a user for a user to select what will be displayed to identify the event. In the illustrated example, icons identifying the object type property type together with a description of the object and the properties are to be displayed as illustrated at reference 1304 on display 1300.

As will be evident from FIG. 13, the event 1304 displayed on display 1302 may be defined as an object type different from a journey or waypoint object. As illustrated in FIG. 13, the event 1304 has displayed with it label 1306 setting out the nature of the event and temporal data.

Processor 104 executes instructions to display screen 1400 which provides user input fields 1402 to select a proximity type, intrinsic property or geocoded property, parameter from a user. In the illustrated example, intrinsic proximity has been selected causing processor 104 to execute instructions to display a user input region 1404 for the input of parameters to define the type of event in respect of which proximity will be determined, 1406, what the proximity will be discriminated on, 1408, (in the described example discrimination will be based on "type"), the temporal proximity "15 min" (15 minutes), 1410, and spatial proximity "500 m" (500 metres), 1412, to the event. Optionally, the proximity parameters previously input by a user may be used by processor 104 to provide a default setting which may be changed by a user for use with the displayed event 1304.

Responsive to user actuable "Search" icon 1414 being actuated, processor 104 executes instructions to "search" for journey points of the Blue and Red journey that fulfil the proximity criteria. Optionally, user input region may comprise a further user actuable icon to select both proximity criteria or just one or other of the proximity criteria.

In the described example both proximity criteria are used in the "search". To implement the search request processor 104 executes instructions which compare the geospatial data of respective points of the Blue and Red journey with the geospatial data of the event 1304 to determine which of the points satisfy the proximity criteria. Each point, 1416, 1418, 1420 and 1422 satisfying the criteria is displayed together with a label identifying the journey to which the point belongs and its temporal data.

Although temporal data may not be used for one or more vertices or waypoints, temporal data should be present in order to analyse temporal proximity. Objects without temporal data will be excluded from any temporal analysis and not show up in any display of such an analysis. In the described disclosure, temporal data is not present for things which are not events, so for example building such as a house will only have geospatial data and not temporal data.

Figure 14:
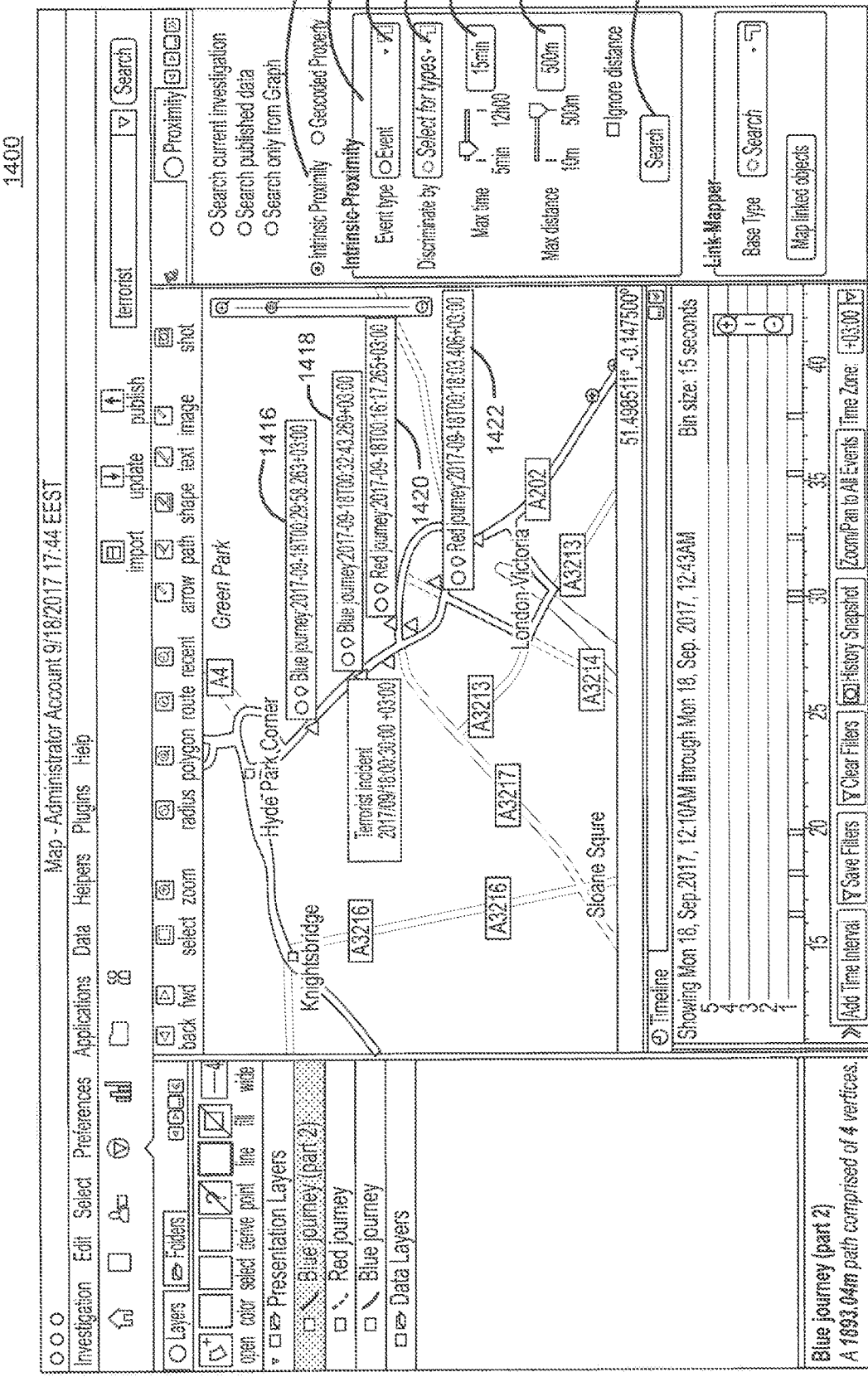
FIG. 14 is a schematic illustration of a ninth user interface display for an example of the claimed subject matter.

A user of the system may therefore visually analyse the colocation and temporal correlation of journey points to the event and each other by way of the graphical presentation illustrated in FIG. 14. Such a graphical representation may be useful to assist in user perception and selection of relevant points from a complex and crowded set of data. Such relevant points may be further analysed.

This may be compared with the manner in which the journey data is illustrated in the screens 10, 11 and 12 in which the integration of data to determine the magnitude proximity parameters should have is assisted by the close proximity of the journey points. Thus, a user may start with a display of close proximity, sometimes referred to as "crowded", data points to identify general regions of interest and then generate a display of low proximity data points to assist in discrimination and selection between and from the low proximity data points. Such visual representation of data may assist a user suffering from visual perception disabilities or having visual perception preferences to navigate through the data. This may be compared with a tabular lay out of data in which each data point tends to be set out equidistant from the other points in respective axes. With such an even distribution correlation between data is not a perceptively clear, at least to a user suffering from limited visual perception skills.

Insofar as embodiments of the invention described above are implementable, at least in part, using a software-controlled programmable processing device such as a general purpose processor or special-purposes processor, digital signal processor, microprocessor, or other processing device, data processing apparatus or computer system it will be appreciated that a computer program for configuring a programmable device, apparatus or system to implement the foregoing described methods, apparatus and system is envisaged as an aspect of the present invention. The computer program may be embodied as any suitable type of code, such as source code, object code, compiled code, interpreted code, executable code, static code, dynamic code, and the like. The instructions may be implemented using any suitable high-level, low-level, object-oriented, visual, compiled and/or interpreted programming language, such as C, C++, Java, BASIC, Perl, Matlab, Pascal, Visual BASIC, JAVA, ActiveX, assembly language, machine code, and so forth. A skilled person would readily understand that term "computer" in its most general sense encompasses programmable devices such as referred to above, and data processing apparatus and computer systems in whatever format they may arise, for example, desktop personal computer, laptop personal computer, tablet, smart phone or other computing device.

Suitably, the computer program is stored on a carrier medium in machine readable form, for example the carrier medium may comprise memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD) subscriber identity module, tape, cassette solid-state memory. The computer program may be supplied from a remote source embodied in the communications medium such as an electronic signal, radio frequency carrier wave or optical carrier waves. Such carrier media are also envisaged as aspects of the present invention.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any sub-sequent correction. Any definitions expressly set forth herein for terms contained in such claims shall govern the meaning of such terms as used in the claims. Hence, no limitation, element, property, feature, advantage or attribute that is not expressly recited in a claim should limit the scope of such a claim in any way. The specification and drawings are, accordingly, to be regarded in an illustrative rather than a restrictive sense.

As used herein any reference to "one embodiment" or "an embodiment" means that a particular element, feature, structure, or characteristic described in connection with the embodiment is included in at least one embodiment. The appearances of the phrase "in one embodiment" or the phrase "in an embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In the foregoing, the use of the term "object" and or the use of the term "instance" or any derivative or simile thereof does not necessarily imply object oriented or object based programming or data structures but may be used to distinguish between different occurrences of a similar type of thing, e.g. there being two or more vertices or waypoints.

In addition, use of the "a" or "an" are employed to describe elements and components of the invention. This is done merely for convenience and to give a general sense of the invention. This description should be read to include one or at least one and the singular also includes the plural unless it is obvious that it is meant otherwise.

In view of the foregoing description it will be evident to a person skilled in the art that various modifications may be made within the scope of the invention. For example, although the map data has been described as being retrieved from storage device 110 it may be the case that it may be retrieved from a network-based storage device such as on server 130. Although two different embodiments have been described for creating a path based on the position of vertices and then joining a path between the chronologically adjacent vertices, other procedures may be utilised to create such a path based on key points, such as vertices.

For disclosures in which spatial interpolation is utilised and disclosures in which temporal interpolation is utilised, waypoint temporal and geospatial data is calculated respectively. However, temporal and geospatial data need not be calculated and any subsequent analysis rely only on geospatial or temporal data for waypoints. The memory structures in which vertices and waypoints have been illustrated are by way of example only. Other configurations of storage structure may be used not just the table-like structure illustrated.

Although one or more embodiments in accordance with the claimed subject matter have been described in which the first and last of vertices defining a path have had temporal data ascribed to them, further and intermediate vertices may also have temporal data ascribed to them. Optionally, just a single vertex may have temporal data ascribed to it and chronological data in effect extrapolated from it in accordance with a perceived speed of movement of the entity whose path is displayed.

In a described example, noting journey points satisfying geospatial and or temporal proximity criteria is by way of setting a flag associated with respective data. However, other ways of noting or recording the criteria being satisfied may be implemented, such as storing journey points satisfying one or more criterion in a separate storage area.

The scope of the present disclosure includes any novel feature or combination of features disclosed therein either explicitly or implicitly or any generalisation thereof irrespective of whether or not it relates to the claimed invention or mitigate against any or all of the problems addressed by the present invention. The applicant hereby gives notice that new claims may be formulated to such features during prosecution of this application or of any such further application derived therefrom. In particular, with reference to the appended claims, features from dependent claims may be combined with those of the independent claims and features from respective independent claims may be combined in any appropriate manner and not merely in specific combinations enumerated in the claims.

What is claimed is:

1. A computer system, comprising:
a hardware computer processor; and
a non-transitory computer readable medium having software instructions stored thereon, the software instructions executable by the hardware computer processor to cause the computer system to perform operations comprising:
receiving two or more instances of a first route object representative of a previously-traveled route, each instance of the first route object comprising a geotemporal attribute including geospatial and temporal data;
mapping the two or more instances of the first route object on to digital map data to define chronologically-adjacent, respective first route vertices;
displaying a digital map based on the digital map data;
receiving user input selecting an interpolation strategy associated with either geographic space interpolation or time interpolation;
in response to selection of geographic space interpolation, receiving an interpolation interval defining geographic distance; or
in response to selection of time interpolation, receiving an interpolation interval indicating either a time period;
determining, according to the interpolation strategy and the interpolation interval received from the user, first waypoints between the first route vertices; and
dynamically updating display of the digital map to include the first waypoints between respective first route vertices at the defined interval.

2. The computer system of claim 1, wherein the two or more instances of the first route object are received from a database.

3. The computer system of claim 1, wherein the hardware computer processor is further configured by the software instructions to provide data to a display driver to configure a display screen coupled to the computer system to:
display the digital map; and
display a first indicium representative of the first route object at respective first route vertices.

4. The computer system of claim 1, wherein the hardware computer processor is further configured by the software instructions to define the first waypoints along a direct path between chronologically-adjacent, respective first route vertices.

5. The computer system of claim 1, wherein the hardware computer processor is further configured by the software instructions to instantiate an instance of a first waypoint object comprising a geotemporal attribute including geospatial and temporal data to define the respective first waypoints.

6. The computer system of claim 5, wherein the hardware computer processor is further configured by the software instructions to determine the geotemporal attribute of the first waypoint object instances based at least on geospatial data and temporal data of one or both of the chronologically-adjacent, respective first route vertices.

7. The computer system of claim 1, wherein the hardware computer processor is further configured by the software instructions to define the first waypoints as a property of a locus defined by the respective first route vertices.

8. The computer system of claim 6, wherein the hardware computer processor is further configured by the software instructions to store the first waypoint object instance in a database.

9. The computer system of claim 3, wherein the hardware computer processor is further configured by the software instructions to provide data to the display driver to configure the display screen to display in the digital map first waypoint indicia representative of a first waypoint object at respective first waypoints.

10. The computer system of claim 3, wherein the hardware computer processor is further configured by the software instructions to:
receive two or more instances of a second route object, representative of a second previously-traveled route, from the database;
map the two or more instances of the second route object on to the digital map data, to define chronologically-adjacent, respective second route vertices
determine, based on the defined interpolation interval received from the user, second waypoints between the second route vertices; and
dynamically update display of the digital map to include the second waypoints between respective second route vertices at the defined interpolation interval.

11. The computer system of claim 10, wherein the hardware computer processor is further configured by the software instructions to provide data to the display driver to configure the display screen coupled to the computer system to display in the digital map a second indicium representative of the second route object at respective second route vertices.

12. The computer system of claim 10, wherein the hardware computer processor is further configured by the software instructions to define the second waypoints along a direct path between chronologically-adjacent, respective second route object vertices.

13. The computer system of claim 10, wherein the hardware computer processor is further configured by the software instructions to instantiate an instance of a second waypoint object comprising a geotemporal attribute including geospatial and temporal data to define the respective second waypoints.

14. The computer system of claim 13, wherein the hardware computer processor is further configured by the software instructions to determine the geotemporal attribute of the second waypoint object instances based at least on geospatial data and temporal data of one or both of the chronologically-adjacent, respective second route vertices.

15. The computer system of claim 10, wherein the hardware computer processor is further configured by the software instructions to define the second waypoint objects as a property of a locus defined by the respective second route object vertices.

16. The computer system of claim 13, wherein the hardware computer processor is further configured by the software instructions to store the second waypoint object instance in a database.

17. The computer system of claim 10, wherein the hardware computer processor is further configured by the software instructions to provide data to the display driver to configure the display screen to display in the digital map second waypoint indicia representative of a second waypoint object at respective second waypoints.

18. The computer system of claim 10, wherein the hardware computer processor is further configured by the software instructions to determine a first proximity value representative of the proximity of a one of the second waypoints or a one of the respective second route object vertices to a one of the first waypoints or a one of the respective first route object vertices fulfilling a first proximity criterion.

19. The computer system of claim 18, wherein the hardware computer processor is further configured by the software instructions to indicate the first proximity value fulfilling the first proximity criterion.

20. A computerized method, performed by a computing system having one or more hardware computer processors and one or more non-transitory computer readable storage device storing software instructions executable by the computing system to perform the computerized method comprising:

receiving two or more instances of a first route object representative of a previously-traveled route, each instance of the first route object comprising a geotemporal attribute including geospatial and temporal data;

mapping the two or more instances of the first route object on to digital map data to define chronologically-adjacent, respective first route vertices;

displaying a digital map based on the digital map data;

receiving user input selecting an interpolation strategy associated with either geographic space interpolation or time interpolation;

in response to selection of geographic space interpolation, receiving an interpolation interval defining a geographic distance; or in response to selection of time interpolation, receiving an interpolation interval indicating a time period;

determining, according to the interpolation strategy and the interpolation interval received from the user, first waypoints between the first route vertices; and dynamically updating display of the digital map to include the first waypoints between respective first route vertices at the defined interval.

\* \* \* \* \*